United States Patent [19]
Takeuchi et al.

[11] Patent Number: 5,175,739
[45] Date of Patent: Dec. 29, 1992

[54] SEMICONDUCTOR OPTICAL DEVICE HAVING A NON-LINEAR OPERATIONAL CHARACTERISTIC

[75] Inventors: Atsushi Takeuchi, Isehara; Shunichi Muto, Atsugi, both of Japan

[73] Assignee: Fujitsu Limited, Kawasaki, Japan

[21] Appl. No.: 758,857

[22] Filed: Sep. 12, 1991

Related U.S. Application Data

[63] Continuation-in-part of Ser. No. 742,589, Aug. 7, 1991, which is a continuation of Ser. No. 404,958, Sep. 8, 1989, abandoned.

[30] Foreign Application Priority Data

Sep. 9, 1988 [JP] Japan ............... 63-224547
May 19, 1989 [JP] Japan ............... 1-126239
Sep. 12, 1990 [JP] Japan ............... 2-241462

[51] Int. Cl.$^5$ ............................................. H01S 3/19
[52] U.S. Cl. ................................ 372/45; 372/21; 372/50; 372/75
[58] Field of Search .............. 372/45, 21, 69, 71, 372/75, 50

[56] References Cited

U.S. PATENT DOCUMENTS

| | | | |
|---|---|---|---|
| 4,705,361 | 11/1987 | Frazier et al. | 350/355 |
| 5,023,879 | 6/1991 | Wang et al. | 372/45 |
| 5,068,867 | 11/1991 | Hasenberg et al. | 372/45 |
| 5,091,756 | 2/1992 | Iga et al. | 372/45 |
| 5,111,153 | 5/1992 | O'Mahony et al. | 372/21 |

FOREIGN PATENT DOCUMENTS 9008411 7/1990 PCT Int'l Appl. ............ 372/45

OTHER PUBLICATIONS

Little, et al., Appl. Phys. Lett. 51(22), Nov. 30, 1987, pp. 1786-1788.
Hulin et al., Appl. Phys. Lett. 49(13), Sep. 29, 1986, pp. 749-751.
Takeuchi, Jpn. J. Appl. Phys. vol. 28, No. 7, Jul. 1989, pp. L-1098-L1100.

Primary Examiner—Georgia Y. Epps
Attorney, Agent, or Firm—Staas & Halsey

[57] ABSTRACT

An optical semiconductor device comprises a first material layer having a first thickness and formed of a first semiconductor material having a first band gap; a first quantum level pair formed in the first material layer in correspondence to the first thickness with a first energy gap that corresponds to an energy of the incident optical beam to be modulated; a pair of second material layers each having a second, smaller thickness chosen to cause the tunneling of carriers through the second material layer, the second material layer being formed of a second, different semiconductor material having a second, larger band gap and provided at both sides of the first material layer; a third material layer having a third thickness larger than said first thickness and provided at least above or below the second material layer; a second quantum level pair formed in the third material layer in correspondence to the third thickness with a second energy gap that is smaller than the first energy gap; and a carrier annihilating part for annihilating the carriers from the second quantum level pair by inducing a stimulated emission of light having an energy identical with the second energy gap.

34 Claims, 27 Drawing Sheets

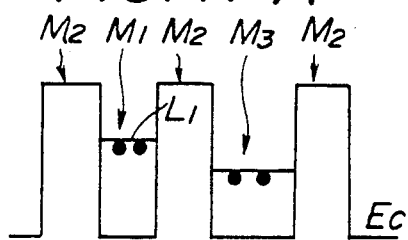
FIG. 17A
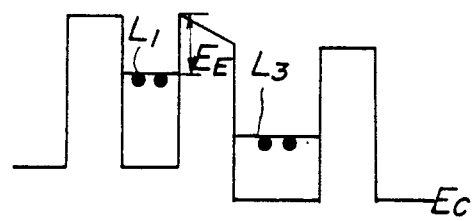
FIG. 17C
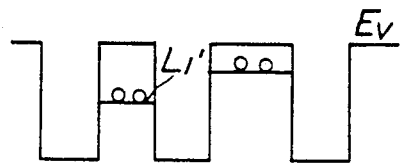
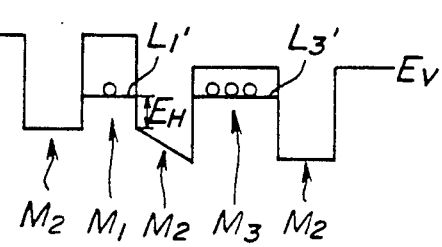
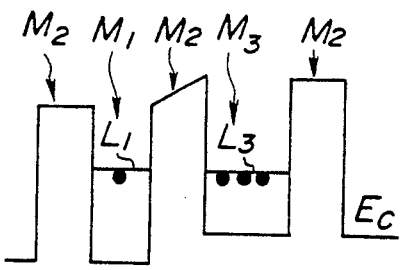
FIG. 17B
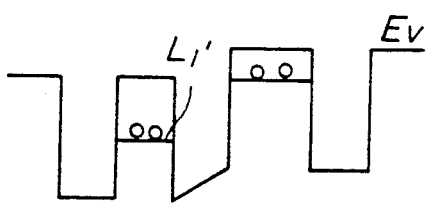

SEMICONDUCTOR OPTICAL DEVICE HAVING A NON-LINEAR OPERATIONAL CHARACTERISTIC

CROSS-REFERENCE TO RELATED APPLICATIONS

The present invention is a continuation-in-part application of the U.S. Pat. application Ser. No. 07/742,589 filed Aug. 7, 1991, in turn a continuation of the U.S. Pat. application Ser. No. 404,958 filed Sep. 8, 1989, now abandoned, the disclosure content of each thereof being incorporated by reference herein abandoned.

BACKGROUND OF THE INVENTION

The present invention generally relates to semiconductor optical devices and more particularly to a semiconductor optical device having a non-linear operational characteristic.

Conventionally, a so-called non-linear semiconductor optical device is studied in relation to the optically operated optical switches, optical bistable devices, optically addressed optical memories and the like. The principle of such a device is based on the switching of its state between an operational state and a non-operational state triggered by an irradiation or alternatively by an interruption of a control optical beam such that the transmission of an optical beam or information optical beam is controlled in response to the control optical beam. For example, the device allows transmission of the information optical beam in the operational state and prohibits the transmission of the information optical beam in the non-operational state, or vice versa.

In such semiconductor optical devices, it is required that the device has an excellent high frequency response particularly when the device is to be used in the optical computers and the like for the optical logic operations. Further, it is desired to control the length of the duration in which the device is in the non-operational state, as desired.

Conventionally, such a non-linear semiconductor optical device is constructed as illustrated in FIG.1, wherein the device represented by M has a superlattice structure based on a repetition of a structural unit which comprises a first material layer Ml of gallium arsenide (GaAs) having a small band gap and a pair of second material layers M2 of aluminum gallium arsenide (AlGaAs) having a large band gap disposed at both sides of the first material layer M1.

FIG.2 shows the energy band structure of this prior art device. In the drawing, the Fermi level is represented by $E_F$, the valence band is represented by Ev, and the conduction band is represented by Ec. Note that the energy gap or band gap between the conduction band Ec and the valence band Ev is substantially larger in the second material layer M2 than in the first material layer M1. Such a first material layer M1 sandwiched between the second material layers M2 forms a band structure known as quantum well in which the energy level of the electrons $\Delta E_n$ measured from the bottom edge of the conduction band Ec of the first material layer M1 is given approximately as $$\Delta E_n = (h^2/8m).(n/L)^2 \tag{1}$$

where n stands for an integer, m stands for the effective mass of an electron in the first material layer M1, h stands for the Planck's constant, and L stands for a thickness of the first material layer M1. Note that the energy level of electrons in the quantum well depends on the effective mass m of the electron and the thickness L of the first material layer M1.

In such a structure, it is known that there is formed an exciton that is an elementary excitation formed by an electron and a hole bounded to each other by the Coulomb interaction, at an energy level slightly lower than the aforementioned energy level by an amount $$8\mu e^4 \pi^2/(k^2 h^2) \tag{2}$$

where $\mu$ stands for the reduced mass of an electron and a hole, k stands for the dielectric constant of the first material, h stands for the Planck's constant and e stands for the elementary electric charge.

In operation, the wavelength of the information optical beam to be controlled by the device is chosen such that the beam causes a resonance with the excitons existing in the layer M1, and the wavelength of the control optical beam for triggering the switching of the device is set such that the control optical beam excites the free electrons to an energy level close to the energy level of the excitons already existing in the layer M1 or such that the control optical beam excites the excitons that have the foregoing energy level.

Next, the principle of operation of this prior art device will be described with reference to FIG.1. When a control optical beam $I_2$ is irradiated to the device under a state that the device is irradiated further by an information optical beam $I_1$ as illustrated in FIG.1, the energy transferred to the device from the optical beam $I_2$ causes an excitation of the free electrons or excitons as already described. The free electrons thus excited causes a screening of the Coulomb interaction, and the screening thus caused disturbs the formation of the excitons in turn. The excitation of excitons by the control optical beam also disturbs the formation of the excitons by causing a releasing of the free electron from the excitons. When such an impediment against the formation of the excitons occurs, the absorption of the information optical beam $I_1$ by the excitons in the layer M1 is reduced. This means that the transparency of the device is creased accordingly. The transition from the operational state to the non-operational state is extremely fast and can be achieved in a matter of about 500 femtoseconds. Thus, the optically controlled switching of such a non-linear optical semiconductor device provides a possibility of optically operated logic devices such as optical switches, optical bistable devices, optically addressed memories and the like.

Such an optical control of the transmittance should be observed also in a bulk crystal of gallium arsenide and the like. However, such a bulk crystal contains therein significant thermal excitations at the room temperature, that such thermal excitations obscure the observation of excitons. Thus, the construction of the non-linear optical semiconductor devices utilizing the optical interaction of light with excitons based on the bulk crystal is extremely difficult. By designing the device to have the superlattice structure that confines the excitons two-dimensionally, the excitons become observable clearly and thus the non-linear semiconductor optical device for the first time becomes the matter of reality.

In the buil crystal, the diameter of a free exciton at the 1S state is represented as $$r = h^2 \epsilon/(2\pi^2 e^2 \mu) \tag{3}$$

where $\mu$ stands for the reduced mass of an electron and a hole, $\epsilon$ stands for the dielectric constant, h is the Planck's constant and e stands for the elementary electric charge. Thus, the thickness of the first layer M1 has to be substantially equal to or smaller than the diameter r given by Eq.(3). When gallium arsenide is used for the first layer M1, r is about 280 Å.

FIG.3 shows another prior art non-linear optical semiconductor device comprising the superlattice structure body M already described with reference to FIG.1 wherein there is further provided a pair of mirrors E at both ends of the body M to form a Fabry-Pérot resonator. The mirror E may be a dielectric multilayer mirror comprising a number of silicon oxide layers and aluminum oxide layers stacked alternately. As the super lattice structure body M used in the device of FIG.3 is identical with the superlattice structure M in FIG.1, the band structure for the device of FIG.3 is identical with the structure shown in FIG.2.

The device of FIG.3 is constructed such that, when the information optical beam $I_1$ is irradiated on the device under a state that the control optical beam $I_2$ is not incident thereupon, there holds a relationship $$m\lambda/2 = nL$$

where m is an integer, $\lambda$ stands for the wavelength of the optical beam $I_1$, L stands for the thickness of the superlattice structure M, and n stands for the refractive index of the superlattice structure M. Note that the foregoing relationship indicates the resonance, and the thickness L and the refractive index n of the device is set such that there holds a resonance when the device is irradiated only by the information optical beam $I_1$.

When the above condition is met, the absorption of the information optical beam $I_1$ by the device becomes minimum and the optical beam $I_1$ passes through the device without substantial absorption. When, on the other hand, that the device is further irradiated by the control optical beam $I_2$, the free electrons causing the screening of the Coulomb interaction are excited or the excitation of excitons having energy level corresponding to the control optical beam $I_2$ is caused. As a result, formation of the excitons interacting with the information optical beam $I_1$ is disturbed or reduced and the refractive index n of the superlattice structure M is changed. When the refractive index n is changed, the foregoing relation corresponding to the resonance does not hold anymore. This state is illustrated in FIG.4. Note that the reflection of the optical beam $I_1$ by the mirror E does not occur at the node of the optical beam because of the change of the effective optical path between the pair of mirrors E. As a result, the absorption to the information optical beam $I_1$ is increased and the transmission of the beam $I_1$ through the device is interrupted. Thus, this device of FIG.3, too, controls the transmission of the information optical beam in response to the irradiation and interruption of the control optical beam $I_2$.

In addition to the aforementioned devices, there are a number of possibilities to construct such a non-linear semiconductor optical device wherein the control of the transmission of optical beam is achieved by irradiation of another optical beam. Some typical examples are as follows.

a) A device constructed such that it is opaque when the control optical beam is not irradiated but becomes transparent when the control optical beam is irradiated. In such a device, the resonance appears only when the control optical beam is irradiated additionally to the information optical beam.

b) A device of which state is changed between a completely off-resonant state $((m+\frac{1}{2})\lambda/2 = nL)$ and an incompletely off-resonant state. This device is further divided into a first type in which the completely off-resonant state is achieved in response to the irradiation of the control optical beam and thereby causing a transition from a transparent state to an opaque state, and a second type in which the incompletely off-resonant state is achieved responsive to irradiation of the control optical beam and thereby causing transition from the opaque state to the transparent state.

c) A device of which state is changed between a first off-resonant state close to the resonant state and a second off-resonant state that is close to the completely off-resonant state.

In any of these prior art devices, there is a problem in that the recovery from the operational state to the non-operational state needs a duration that is substantially longer than the time for the transition from the non-operational state to the operational state. FIG.5 shows a response of the device obtained when a control optical beam is irradiated on the device of FIG.1 in the form of an optical pulse with a pulse width of 100 femtosecond. As can be seen from the plot, the time needed to cause transition from the operational state to the non-operational state is only about 0.4 picoseconds while the time needed to recover the original operational state is much longer. The reason of this slow recovery is attributed to the long relaxation time for removing or expelling the free electrons from the first layer M1 after the termination of the control optical beam. Such a slow removal of the electrons deteriorates the high frequency characteristic of the non-linear optical semiconductor device significantly and prohibits the repetitive operation of the device at high speed.

FIG.6 shows the response for the case of the device of FIG.3. In this device, too, the recovery of the operational state is very slow or even worse than the response of FIG.5. As long as the non-linear semiconductor optical device has such a slow response for the recovery to the operational state, the device cannot be used for the high speed optical logic devices of future optical computers.

SUMMARY OF THE INVENTION

Accordingly, it is a general object of the present invention to provide a novel and useful non-linear semiconductor optical device, wherein the aforementioned problems are eliminated.

Another and more specific object of the present invention is to provide a non-linear semiconductor optical device having an improved response particularly at a high frequency range.

Another object of the present invention is to provide a non-linear semiconductor optical device that changes the state from an operational state to non-operational state in response to an irradiation of a control optical beam, wherein the device can be designed to have a desired duration for recovering the original operational state.

Another object of the present invention is to provide a non-linear semiconductor optical device for changing a refractive index in response to an irradiation of a control optical beam, comprising a stacked body that in turn comprises at least a first material layer having a first band gap, a pair of second material layers having a second band gap substantially larger than said first band gap and disposed at both sides of the first material layer, and a third material layer provided at least at one of the second material layers and having a third band gap substantially smaller than said second band gap, wherein said first material layer has a first thickness that allows the existence of two-dimensional excitons therein, said second material layer has a second thickness that allows a tunneling of the electrons from the first material layer to the third material layer, said third material layer has a third thickness set such that at least one quantum level of the electrons formed in said first material layer is different from any of the quantum levels of the electrons in the third material layer, and wherein said change of the refractive index is caused by irradiation of the control optical beam having an energy corresponding to the energy of the excitons formed in the first layer. According to the present invention, the free electrons formed in the first material layer by the irradiation of the control optical beam are dissipated into the third material layer through the second material layer quickly by the tunneling. As a result, the free electrons that have been disturbing the formation of the excitons in the first material are quickly removed from the first material layer, and the device returns quickly to the original state when the irradiation of the control optical beam is terminated. Further, the time needed for the device to return to the original state can be set as desired by choosing the material forming the superlattice body or by suitably choosing the thickness of the first, second and third material layers.

More in detail, the control optical beam induces an excitation of the free electrons or excitons in the first material layer at a high speed and the transmittance of the device is rapidly changed in response to the irradiation of the control optical beam. When the irradiation of the control optical beam is terminated, the free electrons that have been formed as a result of the excitation or as a result of the ionization of the excitons are removed from the first material layer to the third material layer within a predetermined short time. As the third material layer is designed to have the quantum levels such that at least one quantum level of the electrons in the first material layer is different from any of the quantum levels of the electrons of the third material layer, there always exist an energetically low quantum level in the third material layer in correspondence to the quantum level in the first material layer that interacts with the control optical beam. Thus, an electron in the first material layer, when passed through the second material layer by tunneling to the third material layer, quickly falls into such low quantum levels. As a result, the device recovers its original state after a time needed for the tunneling of the electrons through the second material layer. This duration for the tunneling is mainly determined by the thickness of the second material layer, thickness of the first material layer forming the quantum well, band gap of the second material, and the like. Thus, the device of the present invention has an improved response particularly in the high frequency range and the time in which the triggered state or non-operational state continues can be set as desired.

In one preferred embodiment of the present invention, the non-linear optical semiconductor device comprises a pair of mirrors sandwiching the stacked body to form a Fabry-Pérot resonator. According to the present invention, the signal-to-noise ratio of the device is improved.

In another preferred embodiment of the present invention, the non-linear semiconductor optical device uses the first material layer and second material layer having respective compositions and thickness chosen such that the energy difference between the ground state of the holes and the ground state of the electrons in the third material layer is substantially larger than the energy difference between the quantum level of the holes and the quantum level of the electrons that are interacting with the optical beam in the first material layer. By choosing the composition and the thickness of the material layers as such, the material layer, of which transmittance is to be controlled by the device, is avoided. By providing mirrors at the both ends of the stacked body in this embodiment, the signal-to-noise ratio is further improved.

In another preferred embodiment of the present invention, the composition and the thickness of the first and second material layers are determined such that the energy difference between the quantum level of the holes in the first material layer and the top edge of the valence band of the second material layer is substantially smaller than the energy difference between the bottom edge of the conduction band of the second material layer and the quantum level of the electrons interacting with the optical beam in the first material layer. By choosing the composition and thickness as such, the tunneling of the holes through the second material layer from the first material layer to the third material layer is facilitated and the unwanted accumulation of the holes in the first material layer after the removal of the free electrons from the first material layer is avoided. Associated therewith, the formation of the space charge causing the deformation of energy band structure that ultimately leads to the elimination of the efficient removal of the electrons from the first material layer, is avoided.

In another preferred embodiment of the present invention, the unwanted transition of the electrons from the valence band to the conduction band in the third material layer in response to the irradiation of the information optical beam is suppressed by constructing the first, second and third material layer in the form of a quantum well wire or quantum well box structure. As a result, the unwanted absorption of the information optical beam by the third material layer is minimized.

In another preferred embodiment of the present invention, the accumulation of the electrons and holes in the quantum levels in the third material layer is effectively eliminated by forming a cavity that establishes a resonance with the optical radiation released upon the recombination of the electrons and holes. Thereby, the electrons and holes accumulated in the respective quantum levels of the third material layer are annihilated by inducing a spontaneous laser oscillation. Thereby, the efficient removal of the free electrons from the first material layer is guaranteed.

In another preferred embodiment of the present invention, the accumulation of the electrons and holes in the quantum levels in the third material layer is effectively eliminated by irradiating a coherent optical beam to the third material layer with a wavelength that establishes a resonance with the electrons and holes accumulated in the respective quantum levels of the third material layer. Thereby, the accumulated electrons and holes are annihilated by causing a stimulated emission in response to the irradiated optical beam.

Another object of the present invention is to provide a non-linear reflector device wherein the reflectivity of the device is controlled by the irradiation of the control optical beam. The present invention proposes the use of the non-linear optical semiconductor device described above for this purpose. According to the present invention, a non-linear reflector device having an excellent high frequency response is obtained.

Another object of the present invention is to provide a bistable laser diode having a saturable absorption region adjacent to an active region of the laser diode, said saturable absorption region comprising a stacked body of a first material layer having a first band gap, a pair of second material layers having a second band gap substantially larger than said first band gap and disposed at both sides of the first material layer, and a third material layer provided at least at one of the second material layers and having a third band gap substantially smaller than said second band gap, wherein said first material layer has a first thickness that allows the existence of two-dimensional excitons therein, said second material layer has a second thickness that allows a tunneling of the electrons from the first material layer to the third material layer, said third material layer has a third thickness set such that at least one quantum level of the electrons formed in said first material layer is different from any of the quantum levels of the electrons in the third material layer, and wherein said change of refractive index is caused by irradiation of the control optical beam having an energy corresponding to the energy of the excitons formed in the first layer. According to the present invention, one can control the turning-on and turning-off of the laser diode at an extremely high speed.

Other objects and further features of the present invention will become apparent from the following detailed description when read in conjunction with the attached drawings.

BRIEF DESCRIPTION OF THE DRAWINGS

FIGS.17(A)–17(C) are energy band diagrams showing the formation of space charges and the distortion of the band structure caused in association with the space charge formation, together with the construction of a fifth embodiment of the non-linear semiconductor optical device for eliminating the problem of the band structure deformation;

DETAILED DESCRIPTION

Figure 7:
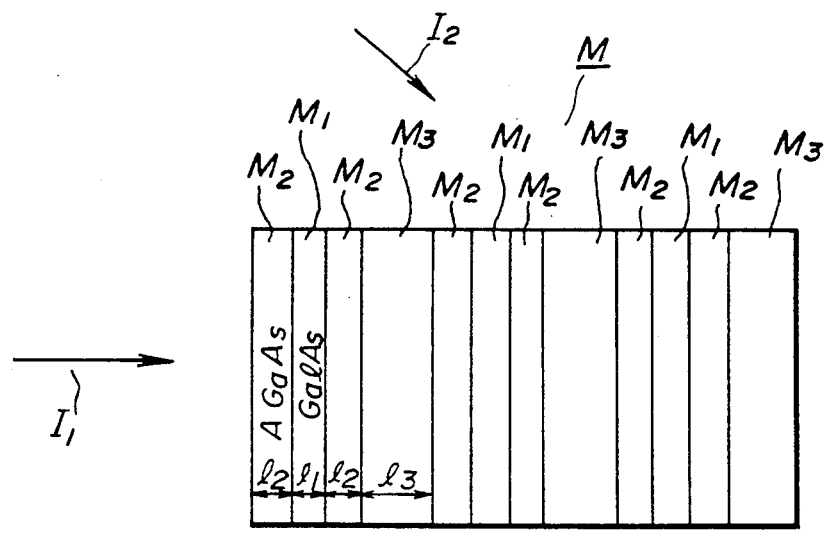
FIG.7 is a schematical view showing the construction of the non-linear optical semiconductor device according to a first embodiment of the present invention.

FIG.7 shows a first embodiment of the non-linear semiconductor optical device of the present invention.

Referring to the drawing, the device comprises a stacked body M that in turn comprises a first material layer M1 having a band gap Eg1, a second material layer M2 disposed at both sides of the material layer M1 and having a band gap Eg2 that is substantially larger than Eg1, and a third material layer M3 having a band gap Eg3 and disposed outside of the material layer M2. The material layers M1, M2 and M3 form a structural unit that is repeated in the stacked body M. Thus, the stacked body M has a superlattice structure with a unit cell comprising the material layer M1, the two material layers M2 at both sides of the material layer M1 and the material layer M3 at one side of the material layer M2.

In this embodiment, the first material layer M1 and the third material layer M3 comprise gallium arsenide while the second material layer M2 comprises aluminum gallium arsenide having a composition of $Al_xGA_{1-x}As$ where $x=0.2-1$ and may have a composition of $Al_{0.51}Ga_{0.49}As$, for example. As the first material layer M1 and the third material layer M3 are formed of the same material, the band gap Eg1 and the band gap Eg3 are equal.

Further, the material layers M1, M2 and M3 have respective thickness of $l_1$, $l_2$ and $l_3$ wherein the thickness $l_1$ of the layer M1 has to be set equal to or smaller than 280 Å so as to allow the existence of excitons in the layer M1. Further, the thickness $l_1$ and $l_3$ are set different from each other so that the material layer M3 has a band structure that is different from that of the material layer M1. In the device of FIG.7, the thickness $l_1$ of the layer M1 is set to 45 Å while the thickness $l_3$ of the layer M3 is set to 90 Å. Further, in order to allow the free electrons excited in the material layer M1 to escape freely into the material layer M3 through the material layer M2, the thickness $l_2$ of the layer M2 is set to a value enabling the tunneling of the electrons through the material layer M2. In the device of FIG.7, the thickness $l_2$ is set to 40 Å. The structure of FIG.7 may be formed by the well established processes such as the molecular beam epitaxy (MBE).

Figure 1:
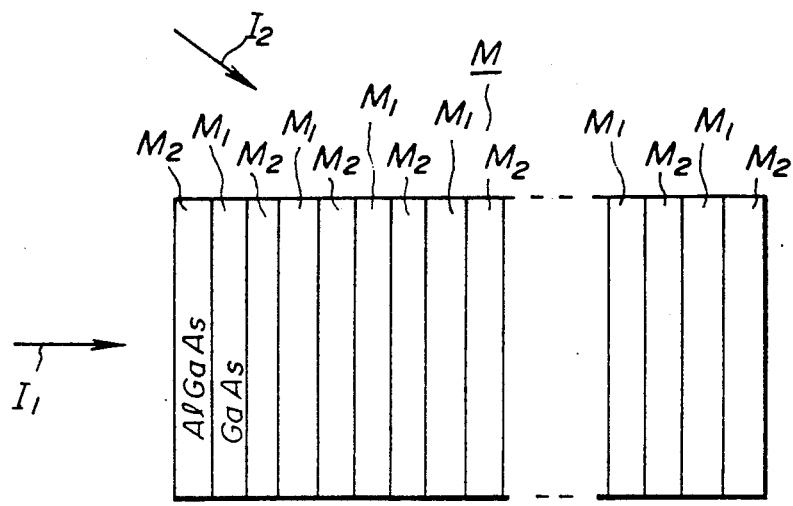
FIG.1 is a schematical view showing a conventional non-linear semiconductor optical device.
Figure 2:
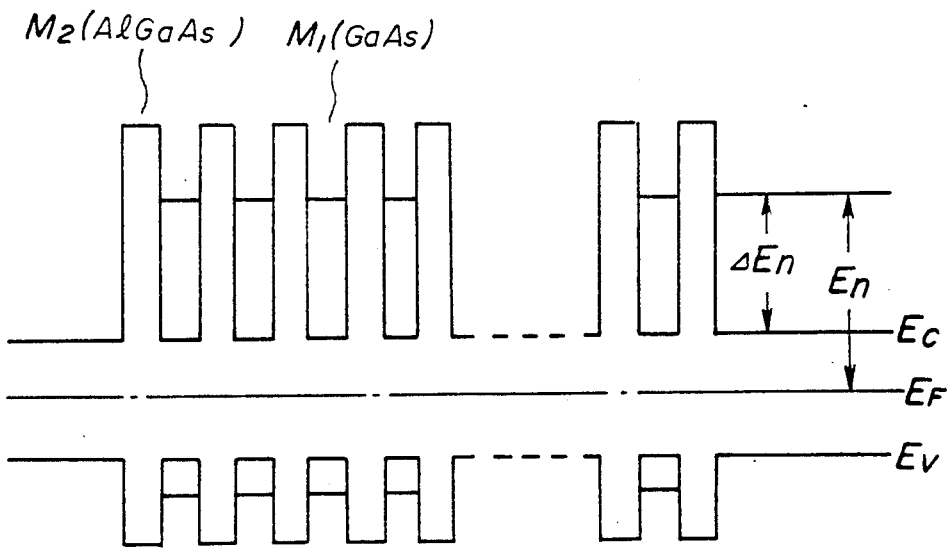
FIG.2 is an energy band diagram showing an energy band structure of the device of FIG.1.
Figure 3:
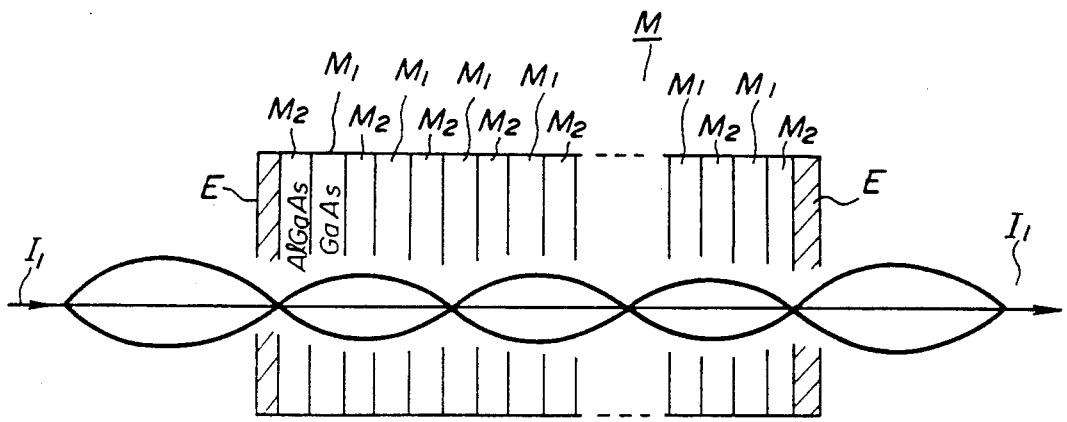
FIG.3 is a schematical view showing another convention non-linear semiconductor optical device in a first state.
Figure 4:
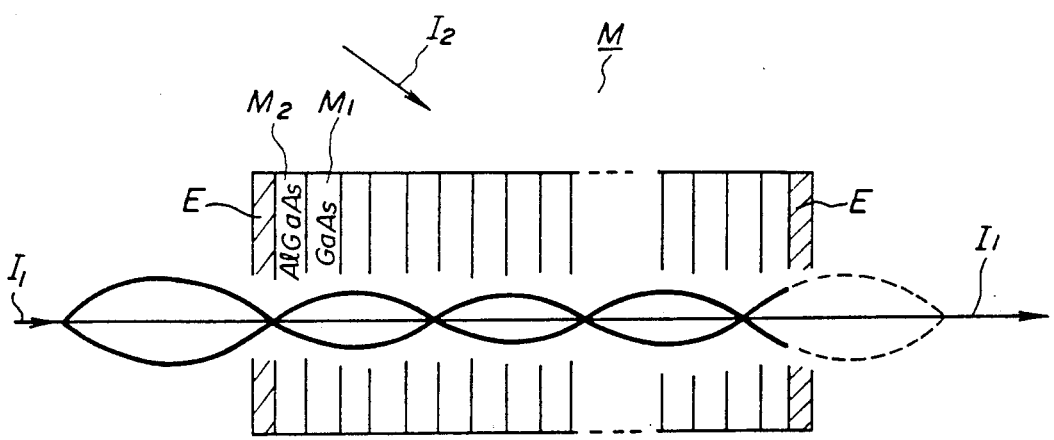
FIG.4 is a schematical view showing the device of FIG.3 in a second state.
Figure 5:
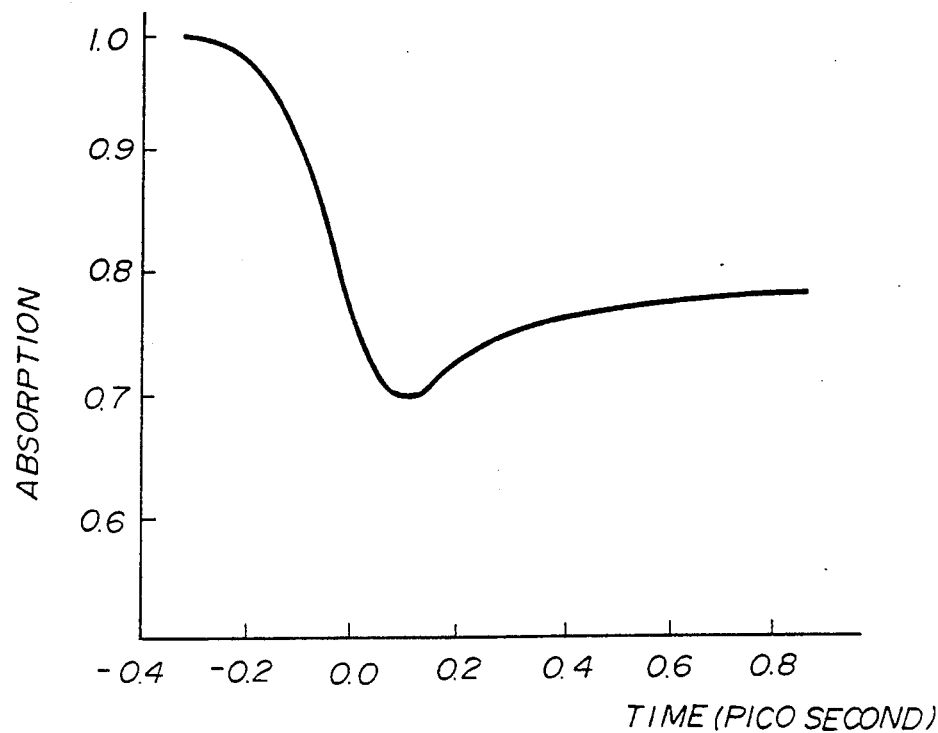
FIG.5 is a graph showing a response of the device of FIG.1.
Figure 6:
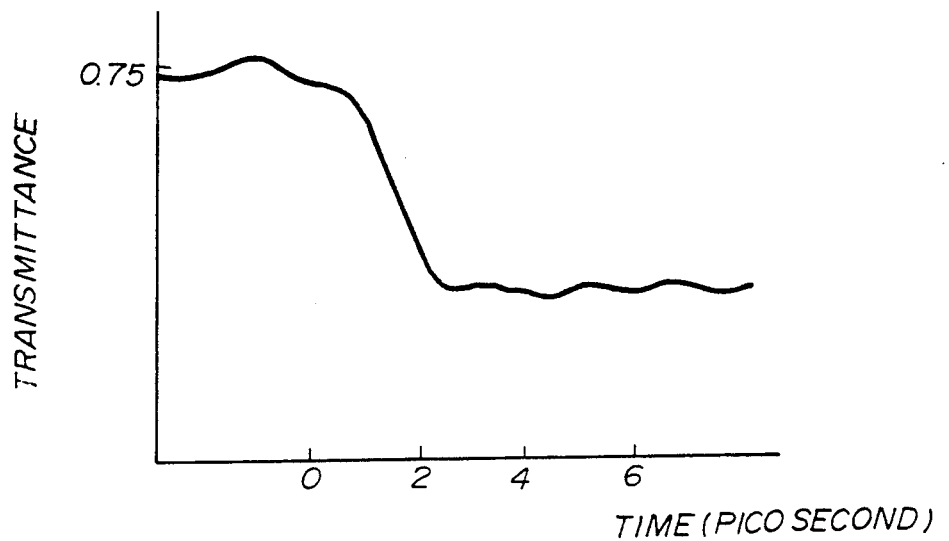
FIG.6 is a graph similar to FIG.5 showing the response of the device of FIG.3.

In the device of FIG.7, an information optical beam $I_1$ is irradiated so as to pass through the layers M1–M3 sequentially while another optical beam $I_2$ is irradiated on the stacked body M obliquely. The optical beam $I_1$ has a wavelength set such that the beam interacts with excitons formed in the first material layer M1 while the optical beam $I_2$ has a wavelength or energy that is sufficient to excite free electrons in the layer M1 to an energy level close to that of the excitons Further, the optical beam $I_2$ excites the excitons into electrons and holes, thus reducing the formation of the excitons. When the formation of the excitons in the layer M1 is reduced by the irradiation of the optical beam, the refractive index of the stacked body M is changed and the transmittance of the optical beam $I_1$ through the body M is changed. Hereinafter, the optical beam $I_2$ will be referred to as a control optical beam. The control optical beam $I_2$ is required to have a wavelength or energy that is sufficient to excite the electrons to the energy level close to that of the exciton. Note that the wavelength of the optical beam $I_2$ may be identical with the wavelength of the optical beam $I_1$. Further, the direction of incidence of the optical beams $I_1$ and $I_2$ are not limited as illustrated but the both optical beams may be incident from the same direction. Further, other incidence angle of the optical beams $I_1$ and $I_2$ is also possible. The operation so far described is identical with that of the prior art device described with reference to FIGS.1–3.

Figure 8:
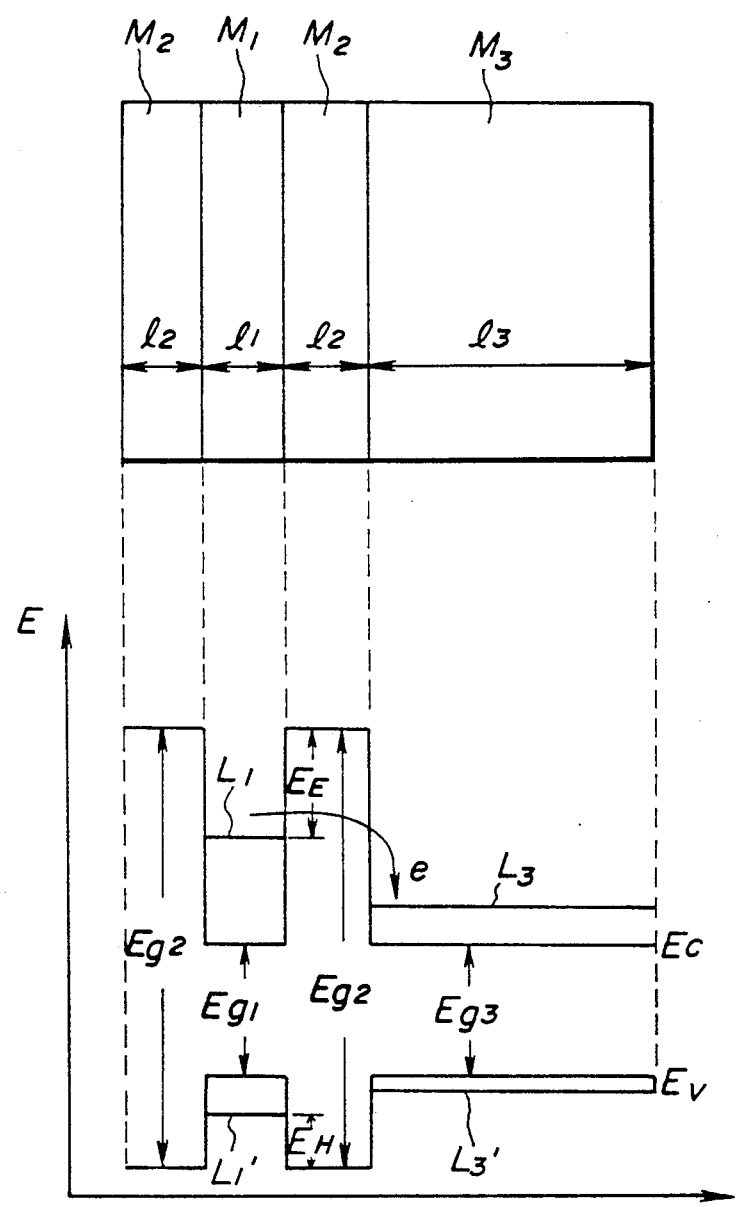
FIG.8 is an enlarged view showing an essential part of the device of FIG.7 together with the band structure for the explanation of the operational principle of the device.

Next, the operation of the device of FIG.7 that characterizes the present invention will be described with reference to FIG.8 showing the essential part of the device as well as the band structure thereof. In the drawing, the quantum level of the electrons in the material layer M1 is designated by L1, the quantum level of the electrons in the material layer M3 is designated by L3, the quantum level of the holes in the material layer M1 is designated by L1', and the quantum level of the holes in the material layer M3 is designated by L3'. In the description hereinafter, it is assumed that these quantum levels correspond to the ground state. However, it should be understood that the present invention is by no means limited as such. In such a so-called quantum well structure wherein the thin material layer M1 is confined between the two material layers M2 having a very large band gap Eg2, it is known that the electrons forms discrete quantum levels above the conduction band Ec. In other words, there are still other discrete quantum levels (not shown) above the levels L1 and L3 in correspondence to the excited states.

In the device of FIG.7, the thickness $l_3$ of the third material layer M3 is set such that, in all of the quantum levels formed in the layer M3, the energy level does not coincide with at least one quantum level of the electrons formed in the first material layer M1. and the layer thickness is given by Eq.(1) previously described. More specifically, as a result of choice of the thickness $l_3$, the ground level L3 in the material layer M3 is formed at a level that is energetically lower than the ground level L1 in the material layer M1. Thus, when an electron e at the ground level L1 is passed through the layer M2 by the tunneling from the material layer M1 to the layer M3, the electron immediately falls into the level L3 that is lower than the level L1 as indicated in FIG.8 by an arrow. In other words, the electrons that have been excited by the irradiation of the control optical beam $I_2$ are immediately removed from the material layer M1 by the tunneling through the material layer M2 and fall into the quantum level L3 of the material layer M3 whenever the irradiation of the control optical beam $I_2$ is terminated. In response thereto, the formation of the excitons in the material layer M1 is resumed.

Figure 10:
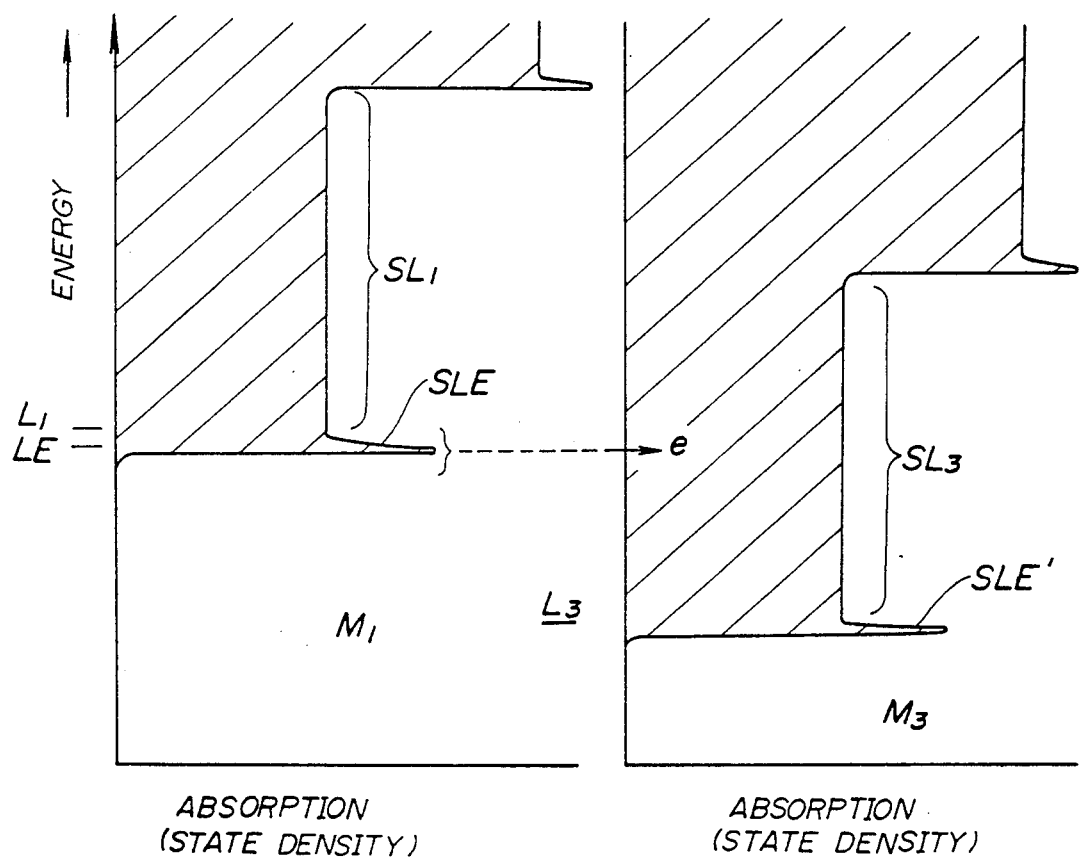
FIG.10 is a diagram showing the state density of the device of FIG.7.

FIG.10 describes &he tunneling of the electrons through the material layer M2 from the layer M1 to the layer M3. In the drawing, the ordinate represents the energy and the abscissa represents the state density of the electrons in each layer. The state density is observed as an absorption of light. Further, the energy level of the excitons given by Eq.(2) is represented approximately by a symbol LE.

In the quantum well structure, the state density increases stepwise in correspondence to the discrete quantum levels with increasing energy. Thus, a step designated in the drawing by SL1 corresponds to the quantum level L1 of the material layer M1 and a step SL3 in the drawing corresponds to the quantum level L3 of the material layer M3. As the state density is obtained from the measurement of the optical absorption, there appears an absorption peak SLE in correspondence to the excitons that have an energy level LE in the material layer M1 Although the exciton level appears also in the material layer M3 as indicated by SLE', this level is substantially lower than the level in the material layer M1.

In the structure having such a state density distribution, the free electrons e having an energy close to the exciton level LE and disturbing the formation of the exciton assume a state having an energy that is the same as the original energy in the material layer M1, when the electrons have tunneled to the third material layer M3 through the second material layer L2. Next, the electrons fall to the ground level L3 along the energy band. Note that the states existing above the quantum levels L1 and L3 are the states pertinent to the two-dimensional band structure formed in the quantum well. Further, it should be noted that there are sufficient number of states to accept the electrons e tunneled through the material layer M2.

Figure 11:
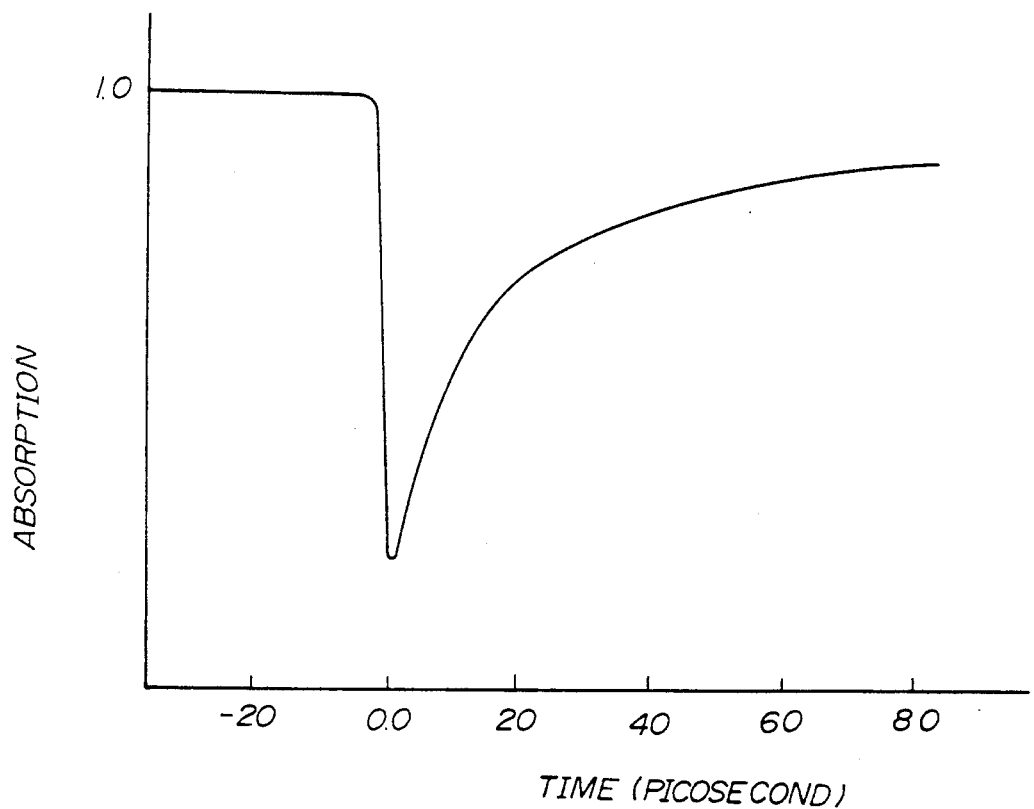
FIG.11 is a graph showing the response of the device of FIG.7.

When the information optical beam $I_1$, with the wavelength chosen to 790 nm for example to cause a resonance with the excitons in the material layer M1, is irradiated as illustrated in FIG.7 in the state that the control optical beam $I_2$ is suppressed, the optical beam $I_1$ is absorbed by the interaction with the excitons. Therefore the material layer M1 behaves almost opaque to the optical beam $I_1$. In this state, when the control optical beam $I_2$ having a wavelength or energy sufficient to excite the electrons from the quantum level L1' at the valence band Ev to the quantum level L1 at the conduction band Ec or to cause the excitation of the excitons is irradiated as shown in FIG.7, the electrons thus excited or emitted disturb the formation of the excitons and the absorption of the optical beam $I_1$ is reduced as shown in FIG.11. This second optical beam $I_2$ may have the same wavelength as that of the first optical beam $I_1$ as already described.

When the irradiation of the control optical beam $I_2$ is terminated, the free electrons thus excited or formed by the ionization of the excitons tunnel through the second material layer M2 to the material layer M3 in a short time period. As a result, the original large absorption is resumed immediately as illustrated in FIG.11. By suitably choosing the layer thickness $l_1$, $l_2$ and $l_3$ as well as the materials for the layers M1, M2 and M3, the time needed to recover the original state can be reduced to as much as about 1/100 as compared to the prior art device.

Figure 12:
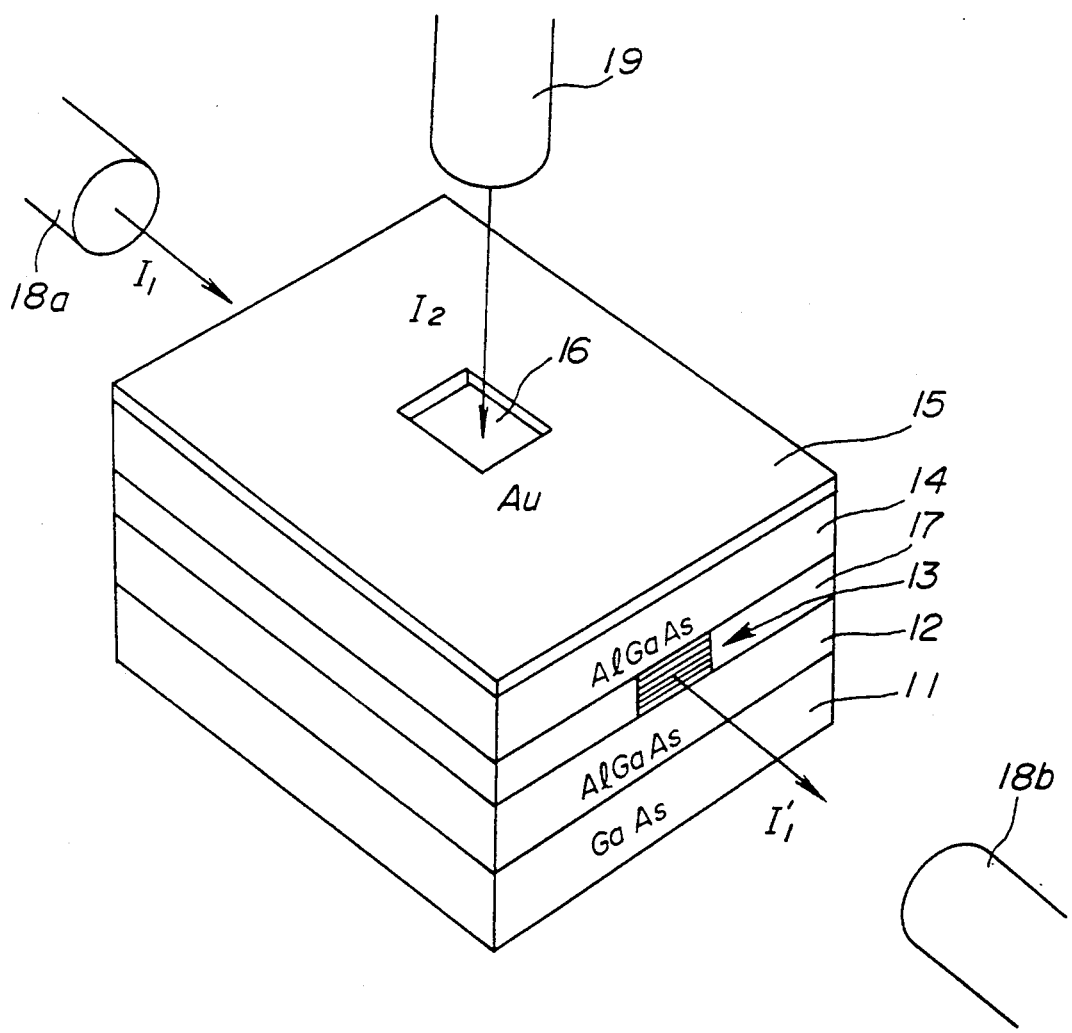
FIG.12 is a perspective view showing an optical device constructed based on the device of FIG.7.

FIG.12 shows a non-linear optical apparatus constructed based on the non-linear semiconductor optical device of the present invention. In this apparatus, the information optical beam $I_1$ is directed to the apparatus through an optical fiber 18a and the apparatus controls the transmission of the optical beam $I_1$ in response to the control optical beam $I_2$ that is directed to the apparatus through another optical fiber 19. In response to the control optical beam $I_2$, the apparatus produces an output optical beam $I_1'$ that is received by still another optical beam 18b. The apparatus is constructed on a gallium arsenide substrate 11 and comprises an aluminum gallium arsenide clad layer 12 having a thickness of 2-3 μm on the substrate. The clad layer 12 supports a stacked body 13 corresponding to the stacked body M of FIG.7 thereon, whereby the stacked body 13 is laterally supported by clad layers 17 of aluminum gallium arsenide. The stacked body 13 comprises a gallium arsenide layer having a thickness of 45 Å and corresponding to the material layer M1, a pair of aluminum gallium arsenide layers having a thickness of 40 Å and has the composition of $Al_{0.5}Ga_{0.5}As$ at both sides of the gallium arsenide layer in correspondence to the material layer M2, and another gallium arsenide layer having a thickness of 90 Å in correspondence to the material layer M3. Each layer is stacked parallel, and it will be seen that there is formed a superlattice structure in correspondence to the stacked body M.

In the illustrated apparatus, the information optical beam $I_1$ is incident substantially parallel to the layers of the stacked body M contrary to the case shown in FIG.7 and the control optical beam $I_2$ is incident substantially vertically to the layers of the stacked body M. Even in such an arrangement, the apparatus operates properly as the operation of the apparatus is based upon the modulation of transmittance of the material layer M1 by the control optical beam $I_2$ that is incident to the material layer M1. In other $I_1$ and $I_2$ to the stacked body M is not limited as shown in FIG.7 but other direction of incidence is also possible.

Figure 13A:
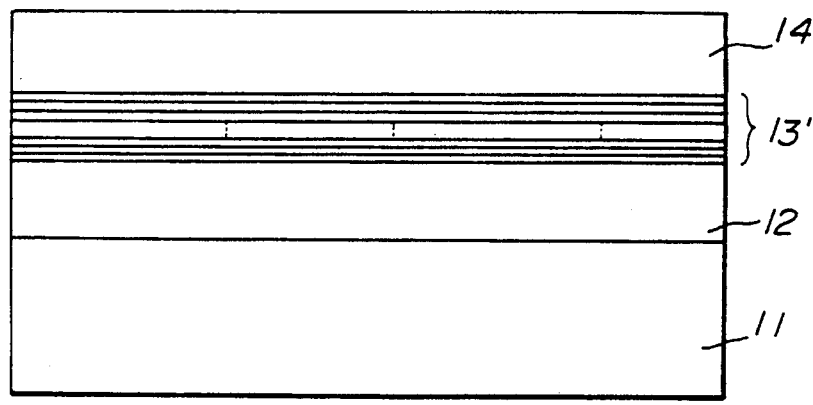
FIGS.13(A) and 13(B) are diagrams showing the steps for constructing the device of FIG.12.

Next, the steps for constructing the apparatus of FIG.12 will be described with reference to FIGS.13(A) and (B).

In a first step, the clad layer 12 is deposited on the substrate 11 for a thickness of about 2-3 μm. Next, a superlattice layer 13' comprising a repetition of the fundamental structural unit each comprising the aluminum gallium arsenide layer having a thickness of 40 Å and the composition of $Al_{0.5}Ga_{0.5}As$, the gallium arsenide layer having a thickness of 45 Å, the aluminum gallium arsenide layer having the thickness of 40 Å and the composition of $Al_{0.5}Ga_{0.5}As$. and the gallium arsenide layer having the thickness of 90 Å, is deposited by the molecular beam epitaxy (MBE) with a layer thickness corresponding to about 100 layers of the fundamental structural unit. Further, the clad layer 14 is deposited on the superlattice layer 13' for a thickness of about 2-3 μm similarly to the clad layer 12. The deposition may also be performed by metal organic chemical vapor deposition (MOCVD) process.

Figure 13B:
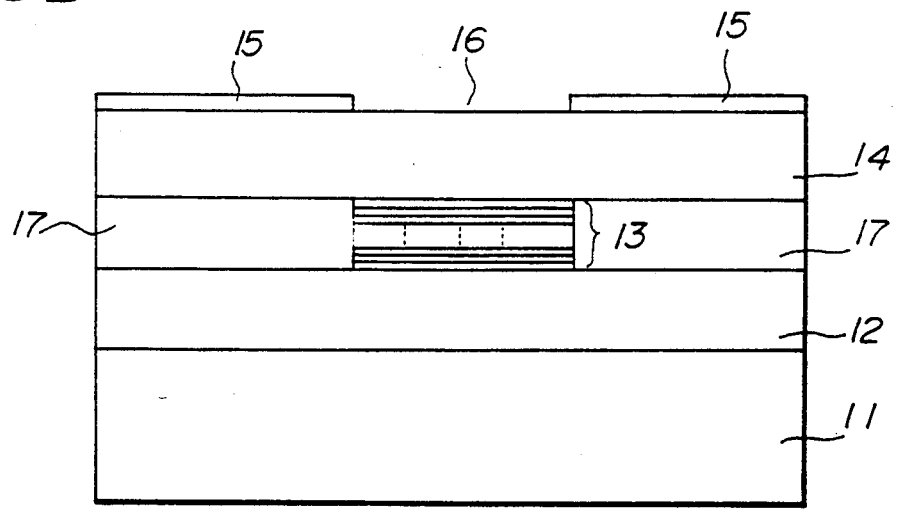

Next, a part of the clad layer 12 is applied with a photoresist (not shown) and those parts not covered by the photoresist are subjected to an ion implantation of silicon. Thereby, the superlattice structure is erased from these parts, and a structure shown in FIG.13(B) is obtained, wherein the stacked body 13 is laterally supported by a pair of the aluminum gallium arsenide layers 17 from which the superlattice structure is erased. Note that the stacked body 13 forms an optical waveguide extending through the apparatus from a side facing the optical fiber 18a to protective film 5 of gold is applied to the surface of the clad layer 14 except for a region 6 acting as a window for the control optical beam $I_2$ Thus, the optical beam $I_2$ from the optical fiber 19 reaches the stacked body 13 through the window 16, and induces the change in the transmittance of the material layer M1.

Next, a second embodiment of the present invention will be described with reference to FIG.14. In the drawing, these parts identical with those described previously in the preceding drawings are given the identical reference numerals and the description thereof will be omitted.

In the present embodiment, metal layers E1 and E2 each having a thickness of about 200 Å are provided at both sides of the stacked body M already described with reference to FIG.7. The metal layers E1 and E2 act as a mirror and there is formed a Fabry-Pérot resonator. In this embodiment, the thickness and materials of the layers M1, M2 and M3 are set such that, under a condition in which only the information optical beam $I_1$ is irradiated on the stacked body M, there holds a relationship $$m\lambda/2 = nL$$

where m is an integer, L stands for the thickness of the stacked body M, and n stands for the refractive index of the stacked body M having the superlattice structure. As already described with reference to the prior art device of FIG.3, the foregoing relationship represents the condition of resonance. Under this condition, the absorption of the incident information optical beam $I_1$ becomes extremely small and the optical beam $I_1$ passes through the device substantially freely.

Figure 14:
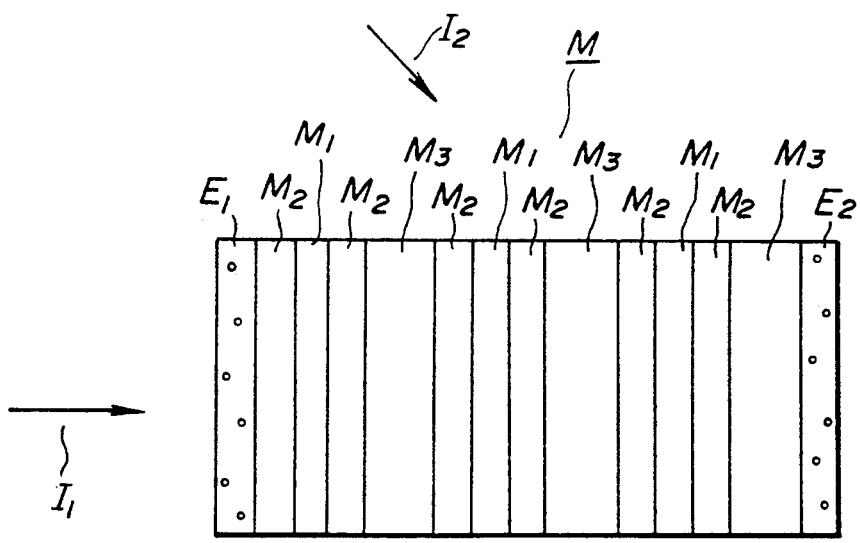
FIG.14 is a schematical view showing the non-linear semiconductor optical device according to a second embodiment of the present invention.

When the control optical beam $I_2$ having the wavelength chosen as already described is incident further to the stacked body M as illustrated in FIG.14, the optical beam $I_2$ excites the free electrons to the energy level close to the excitons formed in the first layer M1. Further, the optical beam $I_2$ may material cause the excitation of the excitons. As a result, the free electrons are formed in the layer M1 and the free electrons thus formed disturb the formation of the excitons in the layer M1 as already described. Such a decrease in the number of the excitons in turn causes the change of the refractive index n of the stacked layer M and thereby the foregoing relation is lost. In other words, the resonance for the optical beam $I_1$ is lost and the absorption of the optical beam $I_1$ increases significantly. This change of the absorption is extremely fast similarly to the case of the first embodiment.

When the irradiation of the control optical beam $I_2$ is interrupted, the free electrons formed in the material layer M1 either by the excitation or by the ionization of the excitons dissipate into the third material layer M3 quickly by tunneling through the second material layer M2. Thus, the absorption of the stacked body M returns quickly to the original state similarly to the case shown in FIG.11 and the resonance before the irradiation of the optical beam $I_2$ is resumed. Similarly to the first embodiment, the time needed to recover the original resonance can be reduced to about 1/100 as compared to the prior art devices. Further, one can adjust the duration as desired by designing the thickness and composition of the material layers M1, M2 and M3.

Next, a third embodiment of the present invention will be described.

Figure 9:
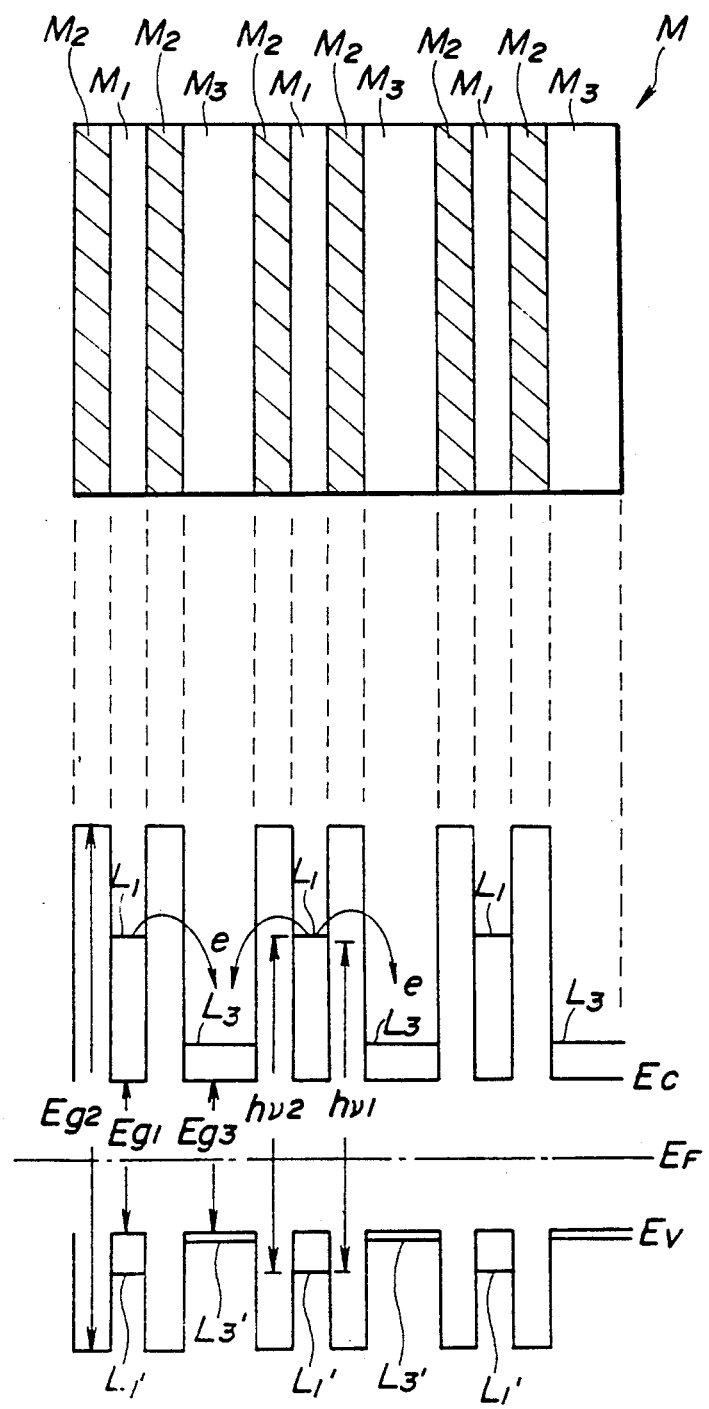
FIG.9 is diagram showing the energy band structure of the device of FIG.7 together with the corresponding structure.

Before starting the description of the embodiment, the problems associated with the first embodiment will be reviewed with reference to FIG.9. From the band diagram of this drawing, it will be understood that the information optical beam $I_1$ interacting with the excitons in the layer M1 has an energy $h\nu_1$ that is sufficient to excite the electrons at the quantum level L3' in the material layer M3 to a level higher than the quantum L3. It should be noted that such an excitation leaves the holes at the energy level L3'. A similar excitation occurs also when the control optical beam having an energy $h\nu_2$ is incident. When such an excitation occurs in the material layer M3, it should be noted that there arises a problem of absorption of the optical beam $I_1$ in the third material layer M3.

Figure 15:
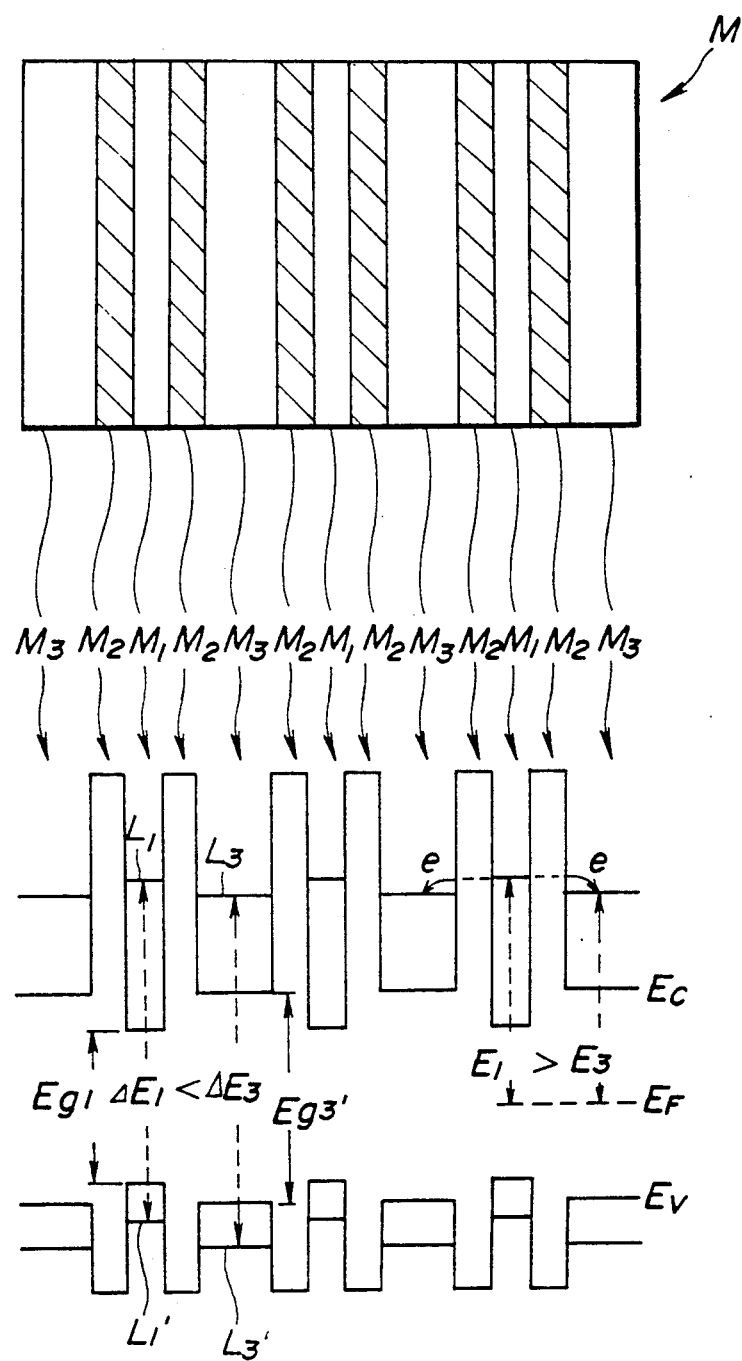
FIG.15 is a diagram showing a third embodiment of the present invention together with the energy band diagram.

The present invention solves this problem by the band structure shown in FIG.15 by suitably choosing the layer thickness of the material layers M1, M2 and M3 as well as by suitably choosing the chemical composition of the materials.

Referring to FIG.9, the non-linear optical semiconductor device of the present embodiment is designed to have an energy band structure wherein an energy $\Delta E1$ needed to excite an electron from the level L1' in the first material layer M1 to the ground state L1 and simultaneously to leave a hole at the energy level L1' is set smaller than the corresponding energy $\Delta E3$ in the material layer M3. In other words there holds a relationship $\Delta E1 < \Delta E3$. Note that the quantum levels L1 and L1' in the first material layer M1 do not necessarily correspond to the ground state. On the other hand, the levels L3 and L3' in the third material layer M3 are assumed to correspond to the ground state. By designing the device as such, the energy of the optical beam $I_1$ becomes insufficient to cause the excitation from the level L3' to the level L3 in the material layer M3.

Further, in order to enable the efficient dissipation of the free electrons from the material layer M1 to the third material layer M3 by the tunneling, the band structure is designed such that the energy E1 of the ground state L1 measured from the Fermi level $E_F$ is substantially larger than the energy E3 of the ground state L3 also measured from the Fermi level $E_F$. In other words, the band structure is designed to satisfy a relationship E1 > E3. In order to realize such a band structure, the present embodiment uses a material having a band gap Eg3' that is larger than the band gap Eg1 of the material layer M1.

In the illustrated example, the first material layer M1 comprises gallium arsenide having the thickness of 35 Å, the second material layer M2 comprises aluminum gallium arsenide having the thickness of 17 Å, and the third material layer M3 comprises aluminum gallium arsenide with a composition of $Al_{0.15}Ga_{0.85}As$ with the thickness of 90 Å. Each layer is deposited by the molecular beam epitaxy, and the structural unit comprising the layers M1, M2 and M3 are stacked for about 100 layers.

According to the present embodiment, the transmission loss of the optical beam $I_1$ by the third material layer M3 is greatly improved in addition to the preferable feature of the quick transition to the high absorption state and the quick recovery of the original state.

In the present embodiment, the composition of the material layers M1, M2 and M3 is not limited as described, but the use of other materials such as aluminum gallium arsenide having the general formula of $Al_xGa_{1-x}As$ or aluminum arsenide AlAs is also possible. Further, the use of indium gallium arsenide (InGaAs) for the material layers M1 and M3 in combination with the use of indium aluminum arsenide (InAlAs) for the material layer M2 is also possible.

Figure 16:
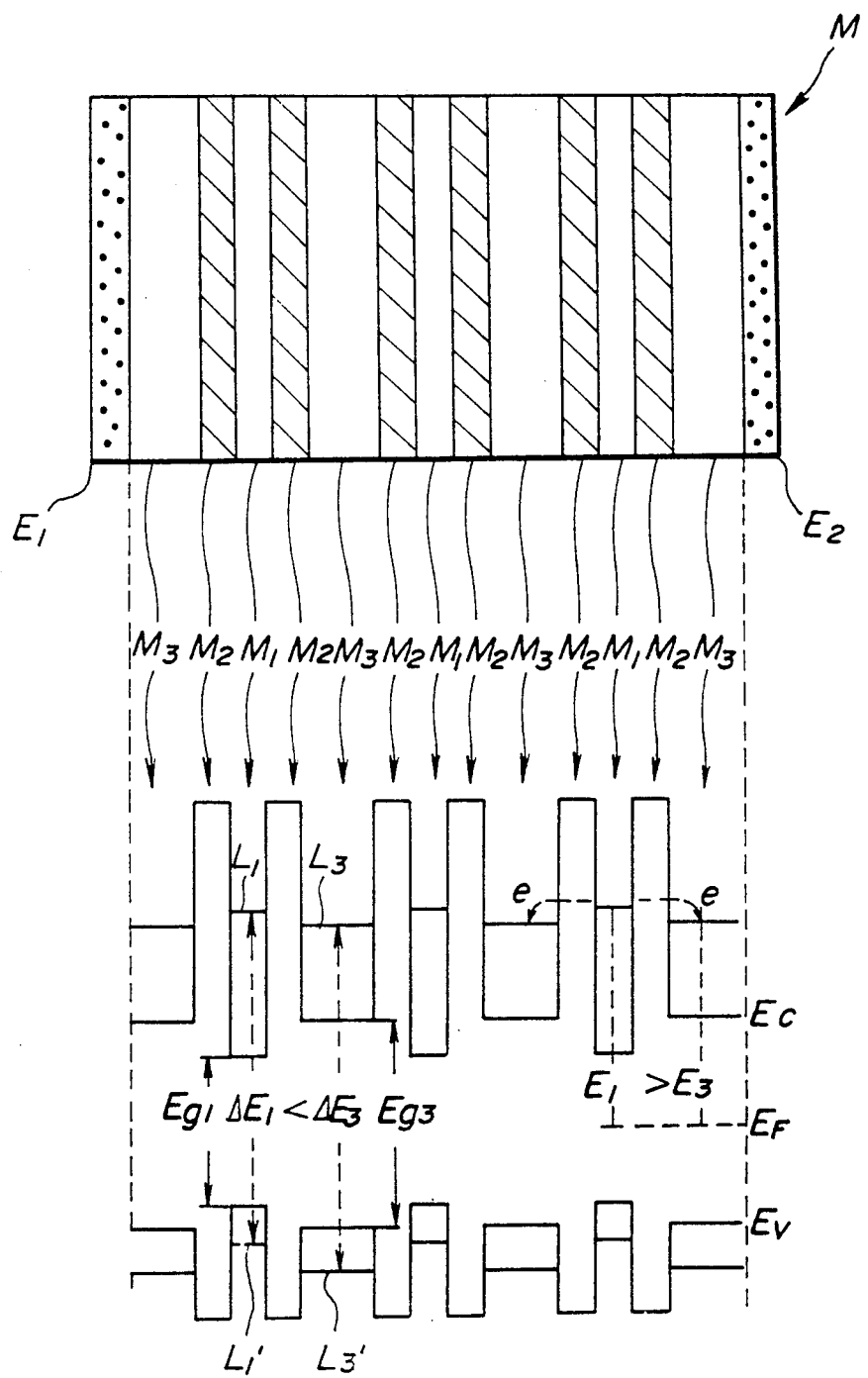
FIG.16 is a diagram showing a fourth embodiment together with the corresponding energy band diagram.

Next, a fourth embodiment of the present invention will be described with reference to FIG.16. In the drawing, those parts that are identical with the parts described already with reference to the preceding drawings are given the identical reference numerals and the description thereof will be omitted.

In this embodiment, the mirrors E1 and E2 are provided at both sides of the stacked body M that has the band structure identical with the structure of FIG.15. Further, the thickness and the composition of the material layers M1, M2 and M3 are set such that the equation of resonance $m\lambda/2 = nL$ is met when the device is irradiated by the information optical beam $I_1$ but not with the control optical beam $I_2$. In response to the irradiation by the optical beam $I_2$, the condition of resonance is lost similarly to the embodiment shown in FIG.14, and the transmittance of the optical beam $I_1$ is reduced quickly. Further, when the optical beam $I_2$ is interrupted, the transmittance recovers rapidly. The device of this embodiment has the feature similar to the device of FIG.15, as the band structure thereof is substantially identical with the device of FIG.16. In other words, the absorption of the optical beams $I_1$ and $I_2$ by the material layer M3 is effectively avoided. As other features and operation of the device is obvious from the foregoing descriptions, further description of this device will be omitted.

Next, a fifth embodiment of the present invention will be described with reference to FIGS.17(A)–(C).

In the embodiments described heretofore, the recovery of the original or initial state of the device is achieved rapidly because of the tunneling of electrons from the material layer M1 to the material layer M3 through the material layer M2. Such a tunneling of the electrons occurs easily as the effective mass of the electrons is small in the compound semiconductors forming the material layers M1, M2 or M3. On the other hand, it is known that the holes have a larger effective mass that is about ten times larger than that of electron in such compound semiconductors. As a result, the wave function of the holes does not have sufficient spreading to cause the tunneling through the material layer M2. Thus, the holes tend to reside in the first material layer M1 after the electrons have escaped to the material layer M1, and there is a tendency that a separation of electrons and hole occurs in the stacked body M. Such a separation causes a formation of space charges across the layers M1 and M3.

FIG.17(A) shows a band diagram substantially identical with the band diagram of FIG.9 that represents the state where there is no space charge formed. FIG.17(B), on the other hand, shows a case in which there appears separation of the electrons and holes as a result of the preferential tunneling of the electrons from the layer M1 to the layer M3. As can be seen from FIG.17(B), the formation of the space charges causes an energetical rise of the material layer M3 relative to the material layer M1, and such an energetical rise ultimately leads to a state illustrated therein, where the energy level of the quantum state L1 of the electrons in the layer M1 is virtually equal to the energy level of the quantum state L3. When such a situation occurs, the dissipation of electrons to the material layer M3 by the tunneling does not occur anymore, as the energy levels of the electrons at both sides of the material layer are identical. Thus, the quick recovery to the initial state is no longer possible and the response of the device becomes substantially identical with the prior art device where there is no third material layer M3.

In the present embodiment, the composition and layer thickness of the material layers M1, M2 and M3 are selected such that the holes experience a potential barrier illustrated in FIG.17(C) at the boundary between the layer M1 and layer M2. Referring to FIG.17(C), there exists a discontinuity $E_H$ in the valence band Ev at the aforementioned boundary such that the discontinuity $E_H$ is substantially smaller than the discontinuity $E_E$ that is formed in the conduction band Ec in correspondence to the same boundary. Note that the discontinuity $E_E$ acts as the barrier for the electrons entering into the layer M2 from the layer M1. Preferably, the discontinuity $E_H$ is set smaller by one-fifth to one-tenth of the discontinuity $E_E$. In such a structure, the probability of the holes tunneling through the layer M2 becomes substantially equal to or larger than the probability of the electrons tunneling through the layer M1. Thus, the holes are transported efficiently through the material layer M2 from the layer M1 to the layer M3 and there is formed a band structure shown in FIG.17(C) that is substantially opposite to the band structure shown in FIG.17(B). In the band structure of FIG.17(C), it should be noted that there is formed a space charge that causes a modification of the band structure such that the energy level of the holes at the state L1' in the material layer M1 and the energy level of the holes at the state L3' in the material layer M3 become ultimately identical. In such a state, the energy level of the layer M3 is decreased as compared to the case of FIG.17(A) where there is no space charge and the level L3 is maintained lower than the level L1. As a result, the tunneling of the free electrons from the material layer M1 to the material layer M3 is always guaranteed and the recovery of the original operational state is achieved in a short time period. Further, as the level L3 is set lower than the level L1 as a result of the equalization of the level of the holes at the states L1' and L3', the removal of the free electrons from the material layer M1 after the termination of the control optical beam $I_2$ is further facilitated.

Such a band structure is realized by choosing the material and the layer thickness of the material layers M1, M2 and M3 as follows:

First material layer M1: $In_{0.53}Ga_{0.47}As$ stacked for 16 atomic layers (=46.9 Å thickness).

Second material layer M2: $In_{0.31}Al_{0.69}As_{0.82}Sb_{0.18}$ stacked for 9 atomic layers (=26.4 Å thickness).

Third material layer M3: $In_{0.53}Ga_{0.47}As$ stacked for 30 atomic layers (=87.9 Å thickness).

These layers may be formed by known molecular beam epitaxy or metal-organic chemical vapor deposition process.

Next, a sixth embodiment of the present invention will be described.

As already noted with reference to the description of the third embodiment of the present invention, the device having the band structure of FIG.9 has a problem of absorption of the information optical beam $I_1$ by the third material layer M3. As described therein, such an absorption is caused by the excitation of the optical beams $I_1$ and $I_2$ respectively having the energies $hv_1$ and $hv_2$ and simultaneously by the number of states or state density that the excited electrons or holes can occupy in the material layer M3. In other words, there will be no transition if there is no state available for the excited electrons or holes, even when the optical beams having the foregoing energies are irradiated. When there is no transition, there will be no absorption.

In the two-dimensional quantum well structure described heretofore, however, the state density increases stepwise with energy as illustrated in FIG.10 and there always exists a substantially large state density such as SL3 for accommodating the electrons tunneled to the material layer M3. As the state density remains constant in each step, the value of the state density in the region SL3 is equal to the state density at the ground level L3. In such a band structure, the incident optical beam $I_1$ or $I_2$ causes a substantial transition of the electrons in the material layer M3 to the energy level close to the energy of the electron e. Thus, a substantial absorption of the incident optical beams $I_1$ and $I_2$ by the material layer M3 has been inevitable.

Figure 18:
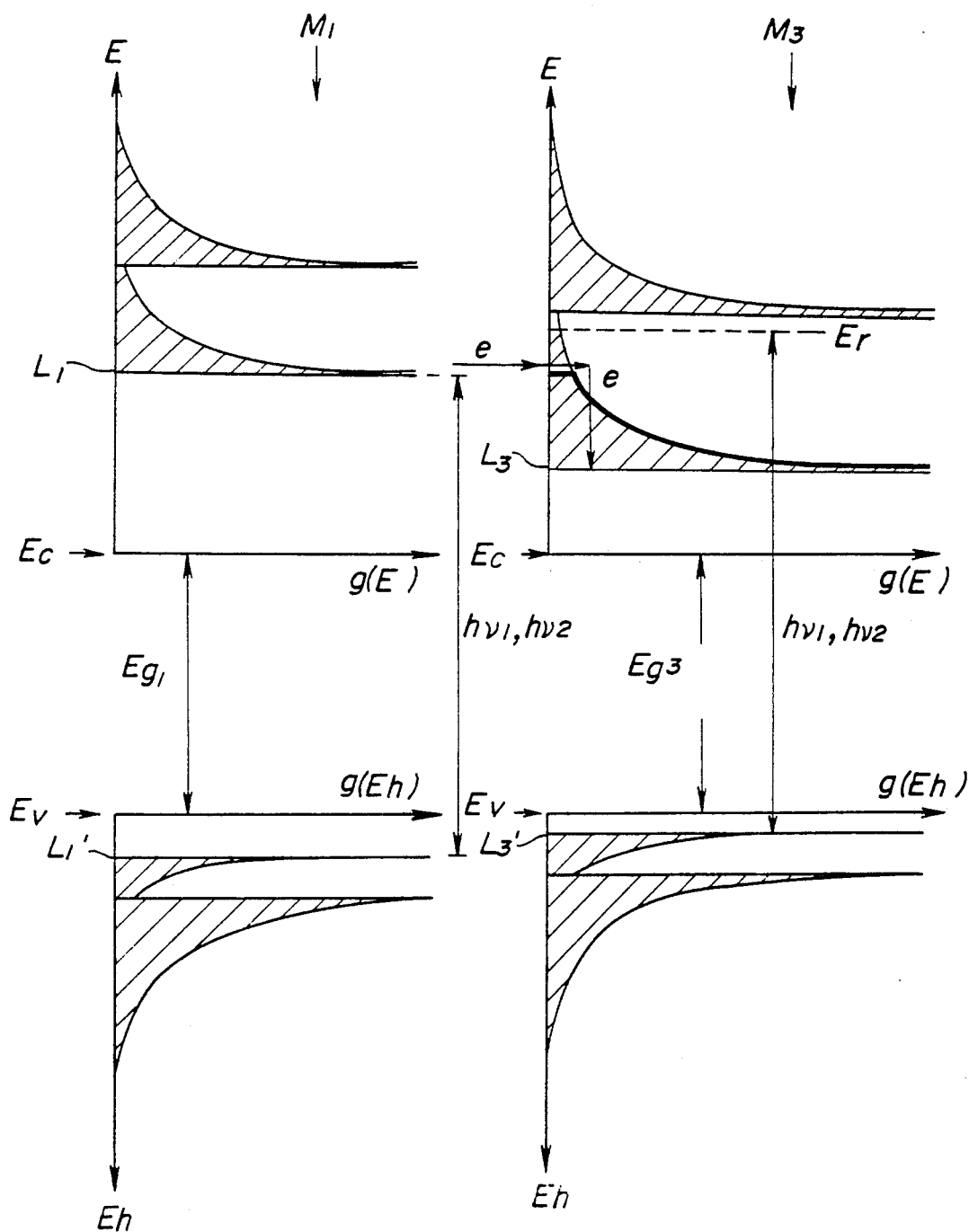
FIG.18 is a diagram showing a state density distribution formed in the non-linear semiconductor optical device according to a sixth embodiment of the present invention.

In the non-linear optical semiconductor device, the probability of transition of the electrons can be decreased significantly if one could design the band structure such that the state density represented as g(E)

decreases rapidly with energy above the level L3 as illustrated in FIG.18. This is because the number of the states that are available for the excited electrons is reduced and the probability of the transition is decreased even if there is an incoming irradiation of the optical beams having the energies that are sufficient to cause the excitation of the electrons from the level L3' to a level Er that corresponds to the energy level of the excitons in the material layer M3. Thus, the band structure shown in FIG.18 can effectively reduce the absorption of the optical beams $I_1$ and $I_2$ by the third material layer M3. In this structure, the number of the states that are occupied by the electrons e after the tunneling through the material layer M2 is also decreased. However, such a decrease in the state density does not affect the effective removal of the electrons, as the state density increases rapidly with decreasing energy as represented in the drawing by a thick line.

Thus, if one could realize the state density shown in FIG.18, the loss of the optical beam $I_1$ by the third material layer M3 can be reduced significantly. In FIG.18, the energy of the holes is represented by Eh.

Next, a structure for realizing the state density of FIG.18 and a method of forming the same will be described with reference to FIG.19 and FIGS.20(A)–(H).

Figure 19:
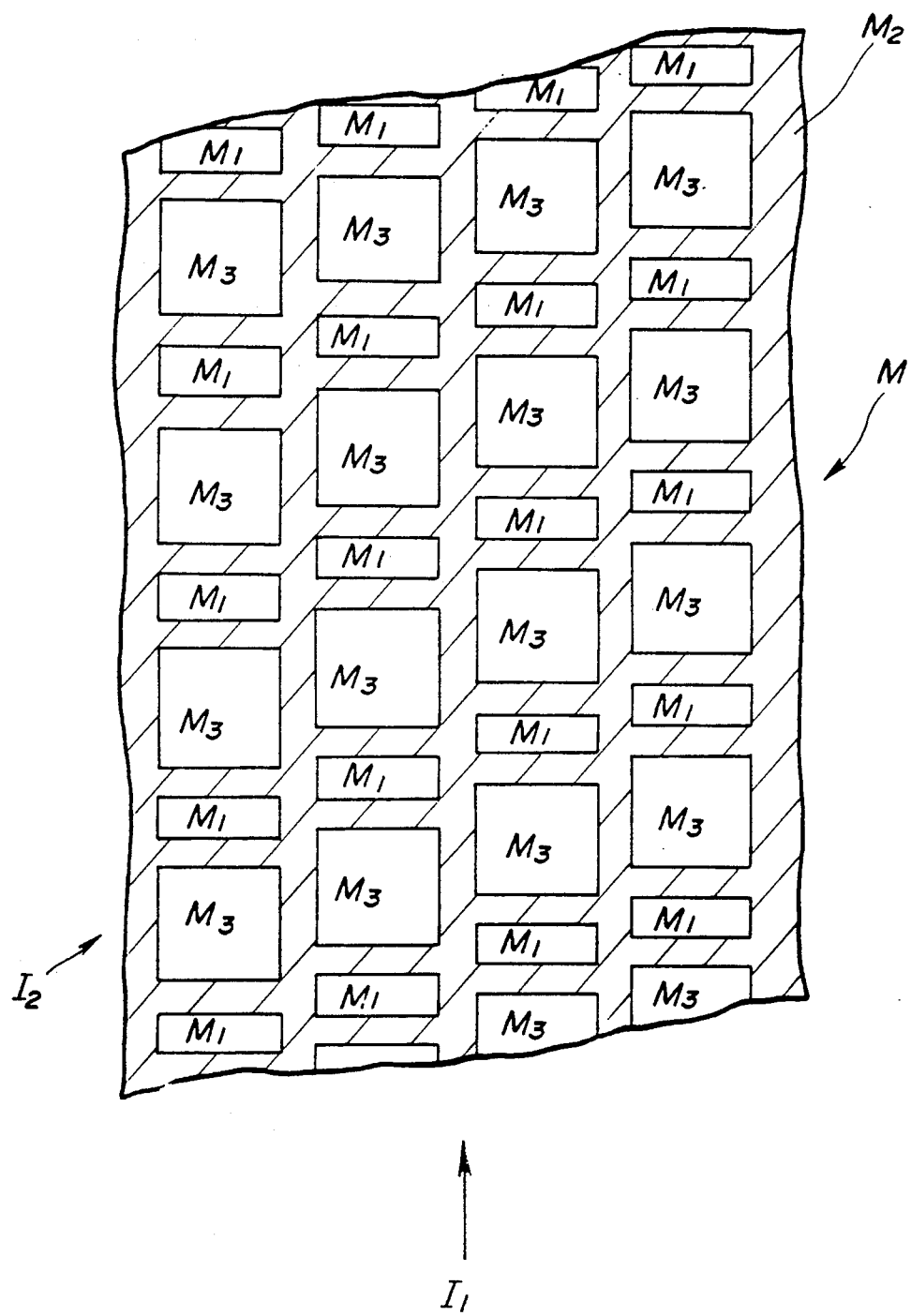
FIG.19 is a diagram showing an essential part of the non-linear semiconductor optical device according to the sixth embodiment of the present invention.

In the present embodiment, the state density of FIG.18 is realized by the so-called quantum well wire structure. FIG.19 shows the sixth embodiment of the present invention having such a quantum well wire structure. In the drawing, the material layers M1 and M3 forming the quantum well wire extend vertically to the plane of the drawing and the material layer M2 fills the space between the layers M1 and M3. The material for the layers M1 and M3 may be gallium arsenide similar to the preceding embodiments while the material for the layers M2 may be aluminum gallium arsenide also in correspondence to the preceding embodiments. In the embodiment illustrated, the thickness for each of the layers M1, M2 and M3 measured in the direction of propagation of the optical beam $I_1$ is set identical with case of the first embodiment.

Figure 20A:
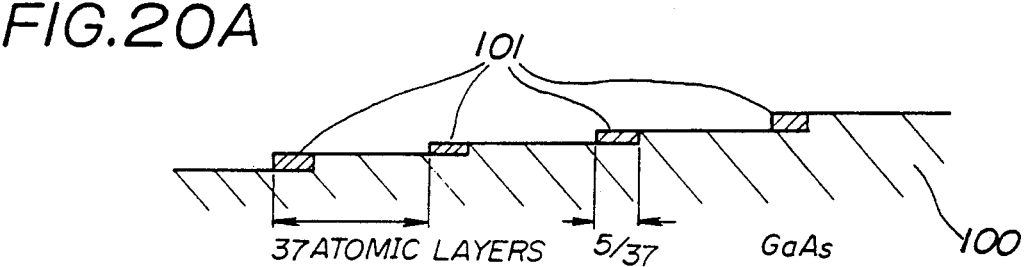
FIGS.20(A)–20(H) are diagrams showing the steps for constructing the device of FIG.19.
Figure 20B:
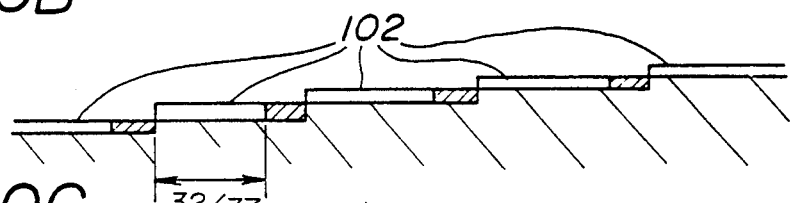
Figure 20C:
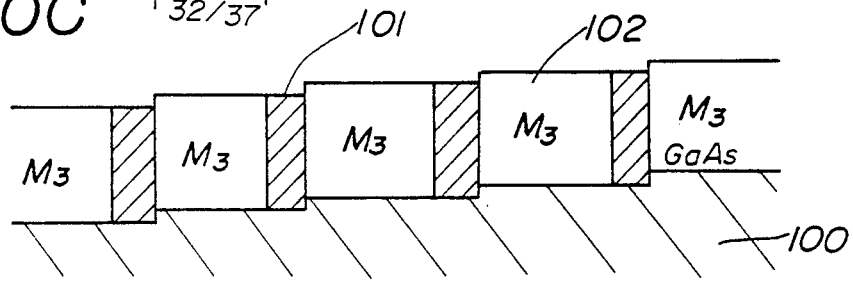
Figure 20D:
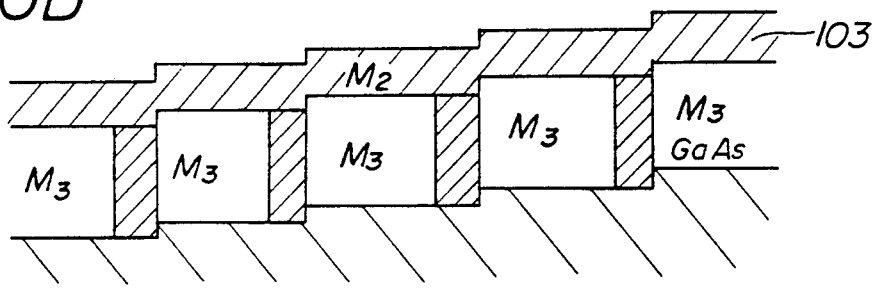
Figure 20E:
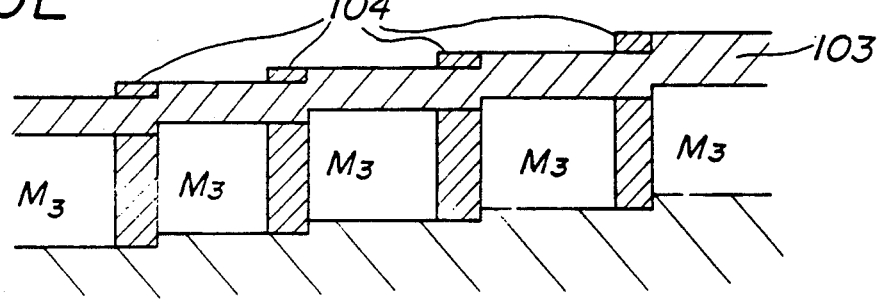
Figure 20F:
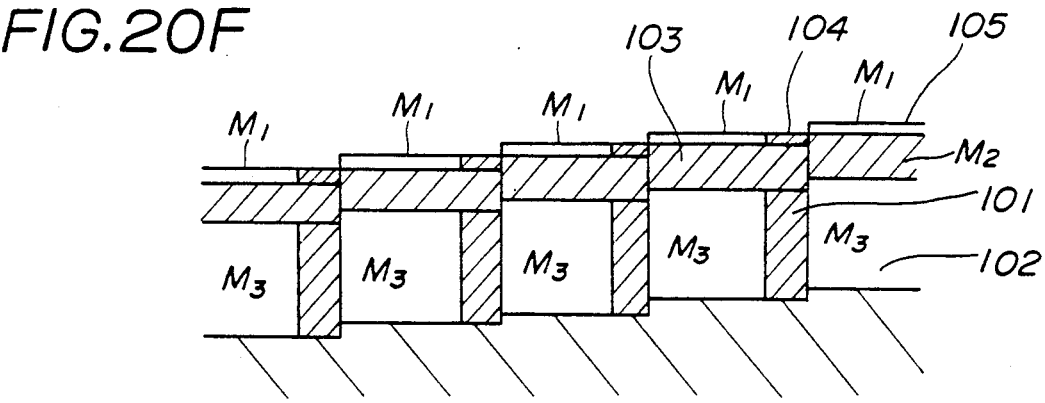
Figure 20G:
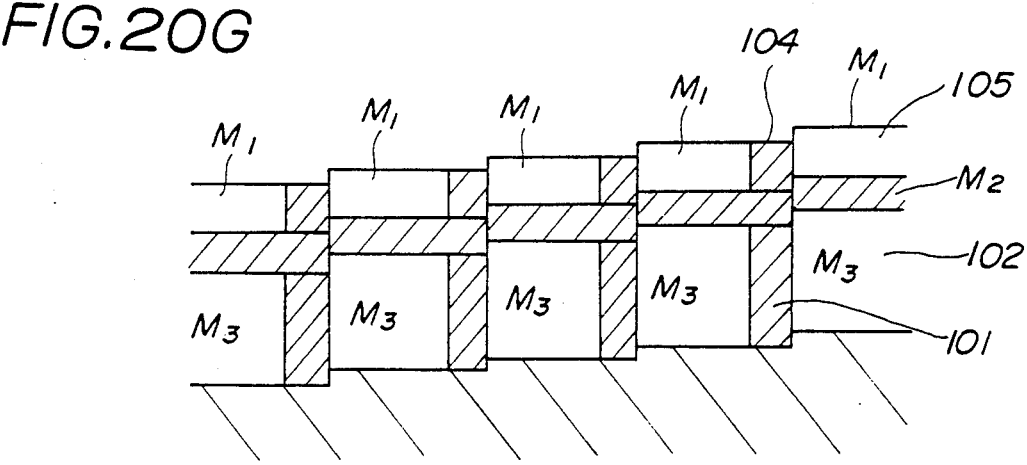
Figure 20H:
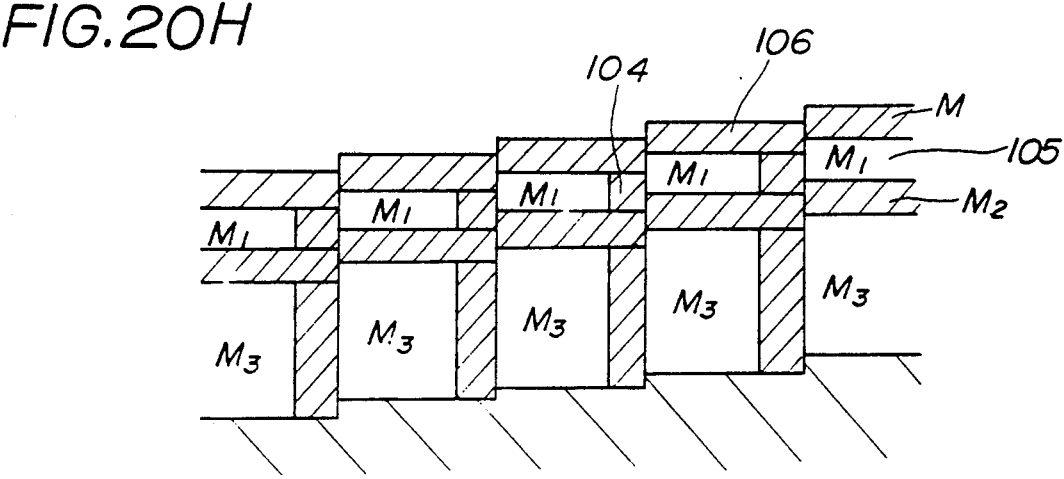

Next, the process of forming the structure of FIG.19 will be described. First, a gallium arsenide substrate 100 having a stepped surface generally extending with an angle of 1.55 degrees relative to the (100) plane is prepared such that each step extends for 37 atomic layers or 104.7 Å as illustrated in FIG.20(A). Note that the surface declines in the [011] or [011] direction and forms the foregoing 1.55 degree angle with respect to the (100) plane. In the structure of FIG.20(A), an aluminum gallium arsenide layer 101 corresponding to the material layer M2 is grown from the edge of the step for a distance of 39.6 Å or fractional distance of 5/37 as shown in FIG.20(A). Next, a gallium arsenide layer 102 corresponding to the material layer M3 is grown from the edge of the material layer 101 for a fractional distance of 32/37. As a result, a structure shown in FIG.20(B) is obtained. Further, by repeating the process of growing the layers 101 and 102 for thirty two times, a structure shown FIG.20(C) is obtained in which the material layer M2 and the material layer M3 are repeated alternately along the stepped surface. Next, an aluminum gallium arsenide layer 103 corresponding to the material layer M2 is deposited on the structure of FIG.20(C) to form a structure of FIG.20(D) wherein the top surface is defined by a stepped surface corresponding to the stepped top surface of the structure of FIG.20(C). Next, an aluminum gallium arsenide layer 104 corresponding to the material layer M2 is further grown laterally from the edge of the step epitaxially for a fractional distance of 5/37 similarly to the layer 101 as shown in FIG.20(E) and a gallium arsenide layer 105 corresponding to the material layer M1 is grown from the step edge of the material layer 104 laterally for 32/37 fractional distance to form a structure shown in FIG.20(F). Next, the steps of FIGS.20(E) and (F) are repeated for sixteen times to form a structure shown in FIG.20(G) in which there is formed the material layer M1 with a desired thickness above the material layer M2. Further, another aluminum gallium arsenide layer 106 corresponding to the material layer M2 is deposited on the structure of FIG.20(G) and a structure shown in FIG.20(H) is obtained. In FIG.20(H), the material layer M1 extends perpendicularly to the sheet of drawing with laterally and vertically surrounded by the material layer M2 whereby the so-called quantum well wire structure is obtained. The structure of FIG.19 is obtained by repeating the steps of FIGS.20(A)–(H) for a desired number of times. The process of FIGS.20(A)–(H) can be achieved by molecular beam epitaxy or metal-organic chemical vapor deposition.

Figure 21:
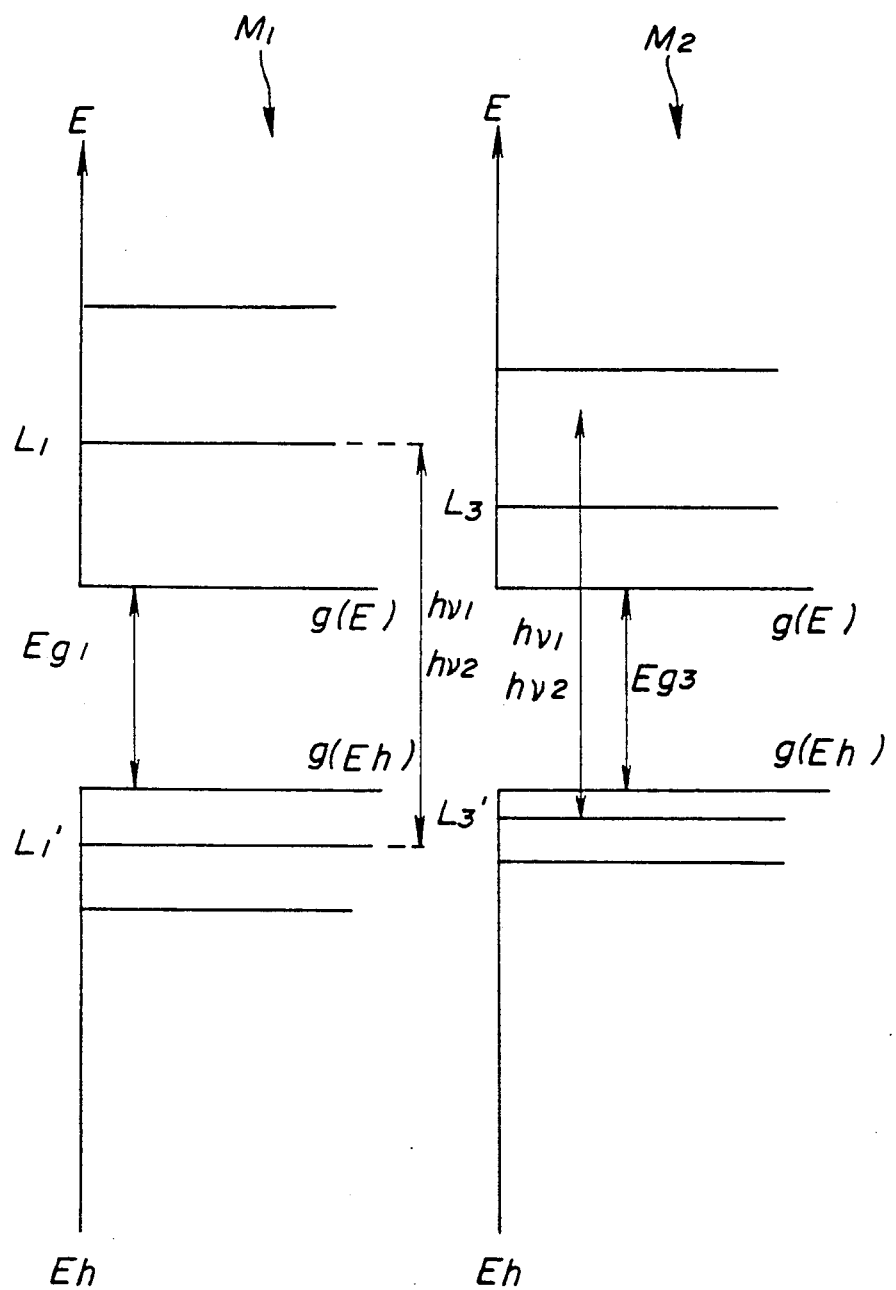
FIG.21 is a diagram showing another state density distribution according to a modification of the sixth embodiment of the present invention.
Figure 22:
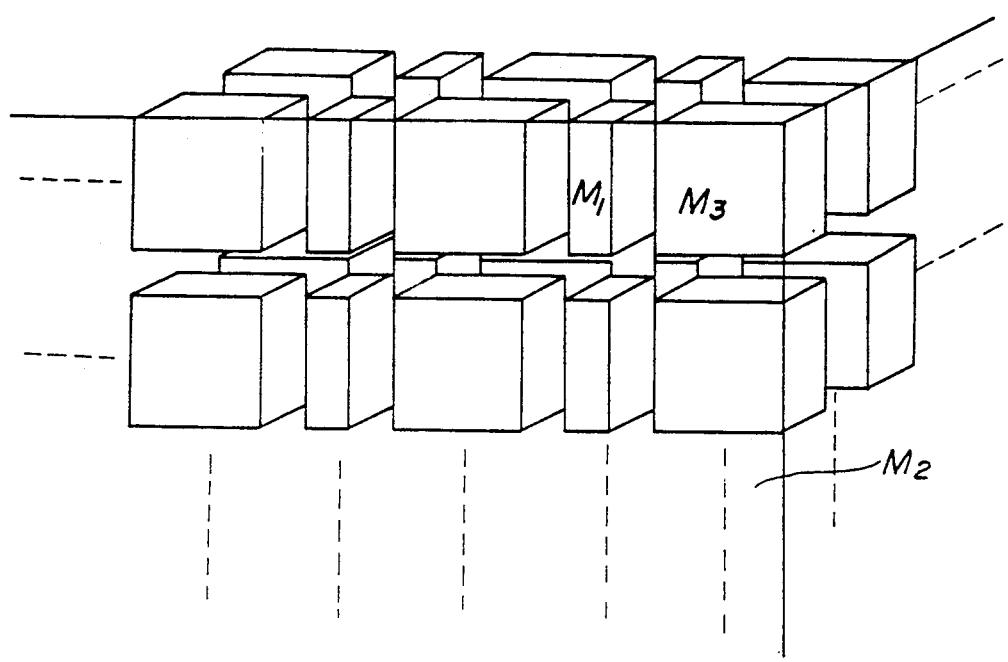
FIG.22 is a diagram showing a structure of the device for realizing the state density distribution of FIG.21.

FIG.21 shows the state density for a device according to a modification of the present embodiment. Such a distribution of the steate density is obtained by a so called quantum well box structure wherein the first and third material layers M1 and M3 are three-dimensionally surrounded by the second material layer M2 as shown in FIG.22. Referring to FIG.21, it should be noted that the state density does not have finite width in the direction of the energy axis, and thus there exists no corresponding excited state for accommodating the excited electrons, except for the discrete quantum levels, even when the electrons are excited from the valence band in the material layer M3 in response to the irradiation of the optical beams $I_1$ and $I_2$. Thus, no transition is caused and the absorption by the material layer M3 is further decreased. Although the state for accepting the electrons e tunneled through the material layer M2 is not existing in such a structure, the electrons can fall into the state L3 by losing its energy by suitable scattering processes such as the collision with phonons, and the removal of the free electrons e from the material layer M1 is performed efficiently.

Next, the process to form the structure of FIG.22 will be described briefly. As the process overlaps considerably with those described with reference to FIGS.20(A)–(H), only the essential part will be described in detail.

Figure 23A:
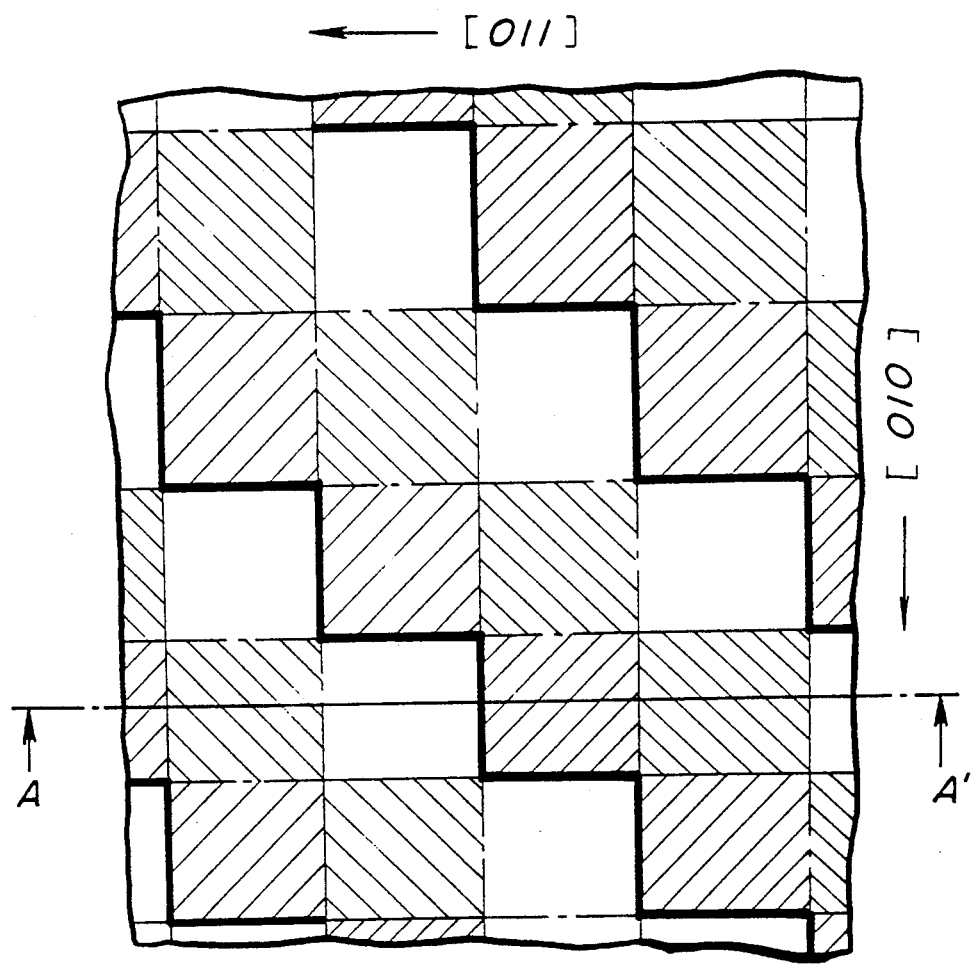
FIGS.23(A) and 23(B) are diagrams showing a step for constructing the structure of FIG.22 and an enlarged view thereof respectively.

In the process of forming the structure of FIG.22, a substrate of gallium arsenide as shown in FIG.23(A) is prepared in which the substrate is defined by a stepped surface declining relative to the (100) plane of gallium arsenide with an angle of 1.55 degrees toward the [011] or [011] direction similarly to the case of FIG.20(A) and simultaneously with an angle of 2.2 degrees toward the [010] direction. As a result, the substrate has a stepped surface as illustrated in FIG.23(A) in which each step is defined laterally by a pair of edges crossing perpendicularly to each other. In FIG.23(A), the stepped surface increases its height from the lower left corner to the upper right corner. When a cross section is taken along a line A-A', a same cross section as FIG.19(A) is obtained.

Figure 23B:
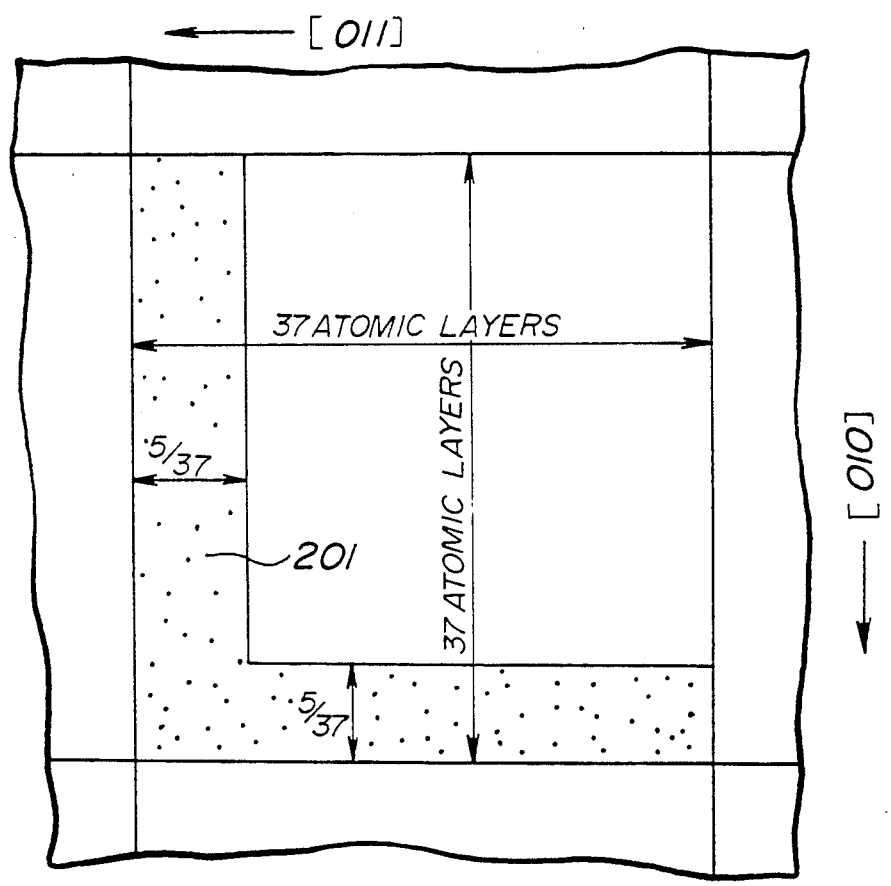

As shown in FIG.23(B), each of the steps of FIG.23(A) comprises an aluminum gallium arsenide layer 102 having a width of 5/37 fractional distances or 39.6 Å similarly to the case of the quantum well wire. Starting from this structure, a same process as in FIGS.20(A)-(H) is repeated. Note that the growth is made two-dimensionally in the case of FIGS.23(A) and (B) whereby layers corresponding to the material layers M1 and M3 are grown laterally for the 32/37 fractional distances and the layer corresponding to the material layer M2 is grown laterally for the 5/37 fractional distances both in the [011] and [010] directions. Note that the number of atoms deposited in each step is proportional to $(32/37)^2 (=1024/1369)$ for the material layers M1 and M3 and is proportional to $[(37)^2-(32)^2]/(37)^2=345/1369$ for the material layer M2 in correspondence to the two-dimensional growth. When the process of FIGS.20(A)-(H) is applied to the structure of FIG.23(A) or (B), the material layer M1 and M3 are completely surrounded by the material layer M2 and the quantum well box shown in FIG.22 is obtained. Note that the material layer M2 is omitted from the drawing in FIG.22 for the sake of clarity. The structure thus obtained has a same cross section as that shown in FIGS.20(A)-(H) when taken along the [011] or [011] direction that is parallel to the line A-A'.

Figure 24:
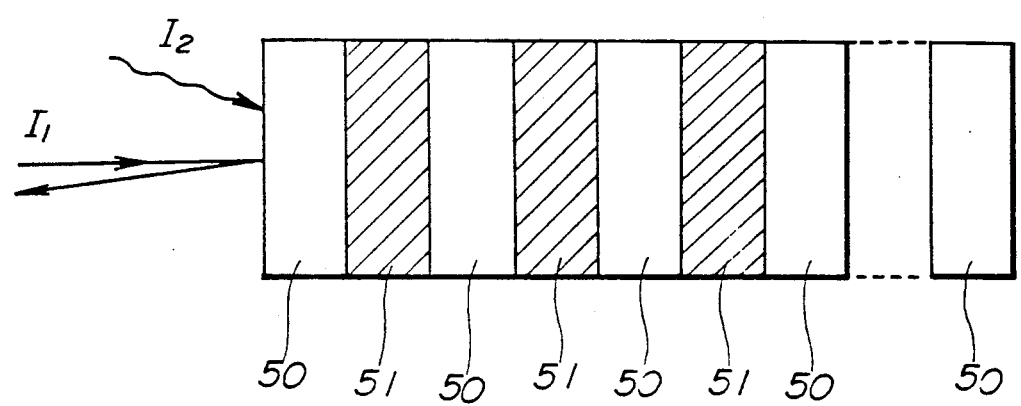
FIG.24 is a diagram schematically showing a non-linear reflector constructed based on the non-linear semiconductor optical device and forming a seventh embodiment of the present invention.

Next, a semiconductor reflector device constructed based upon the non-linear optical semiconductor device according to a seventh embodiment of the present invention will be described with reference to FIG.24.

Referring to the drawing, the reflector device has a multi-layer structure wherein a first semiconductor layer 50 having a first refractive index and a thickness equal to a quarter of the wavelength of the incident information optical beam $I_1$ is stacked alternately with a second semiconductor layer 51 having a second refractive index and a thickness also equal to a quarter of the wavelength of the incident optical beam $I_1$. The first and second refractive indices are determined such that there is established a strong reflected beam as a result of the interference of an incident optical beam and a reflected optical beam produced as a result of the reflection of the incident optical beam at a boundary between the first and second semiconductor layers. Such an interference occurs when the two optical beams have an optical path difference that is a multiple of the half-wavelength of the optical beam. The thickness of each of the semiconductor layers is adjusted according to the speed of light passing therethrough or the refractive index, such that the effective thickness of each layer coincides with a quarter of the wavelength of the light.

In the reflector device of the present invention, the non-linear optical semiconductor device is used as one of the first and second semiconductor layers, for example, the layer 51. The non-linear optical semiconductor device may be the one comprising the first material layer M1 of gallium arsenide having the thickness of 35 Å for allowing the existence of the two-dimensional excitons, the second material layer M2 of aluminum arsenide with the thickness of 17 Å, and the third material layer M3 of aluminum gallium arsenide having the composition of $Al_{0.15}Ga_{0.85}As$ and the thickness of 90 Å. By constructing the non-linear optical semiconductor device as such, the lowest or the ground exciton level in the third material layer M3 becomes lower than the lowest exciton level in the first material layer M1, and the lowest quantum level of the electrons in the first material layer M1 becomes higher than the lowest quantum level of the electrons in the third material layer M3. Such a structure can be fabricated by using the known molecular beam epitaxy, for example. In the reflector device, the first semiconductor layer 50 is also formed by the molecular beam epitaxy by depositing aluminum arsenide such that the first and second semiconductor layers are stacked alternately for twenty layers. In this construction, the first refractive index of the first semiconductor material layer 50 becomes lower than the second refractive index of the second semiconductor material layer 51.

In operation, the optical beam $I_1$ alone is irradiated on the device, and the optical beam is reflected by the first and second semiconductor layers 50 and 51. Thereby, a strong reflection is established. When the control optical beam $I_2$ having a wavelength selected to cause a resonance with the excitons in the first material layer M1 of the layer 51 is irradiated on the reflector device, the formation of the excitons is disturbed and the refractive index of the second material layer 51 is changed. In response thereto, the interference that has produced the strong reflection is lost and the reflectivity of the reflector device is changed.

As the reflector device has the third material layer M3 in adjacent to the second material layer M2 that in turn surrounds the first material layer M1 from both sides in the second semiconductor layer 51, the recovery of the original operational state is achieved in a quite short time. By choosing the composition and thickness of the layers M1-M3 as already described, the absorption of the optical beam $I_1$ or $I_2$ by the third material layer M3 is reduced.

It is of course possible to choose the thickness of the layers 50 and 51 such that the reflection appears only when the optical beams $I_1$ and $I_2$ are irradiated simultaneously.

It should be noted that the material and the layer thickness of the layers M1, M2 and M3 are by no means limited as described but the following combination of materials is also possible for realizing the semiconductor optical device of the present invention.

| M1 | GaAs | GaAs | | InGaAs | InGaAs | InGaAs |
|----|------|------|---|--------|--------|--------|
| M2 | AlGaAs | $Al_{x1}Ga_{1-x1}As$ | | InAlAs | InAlAsSb | InP |
| M3 | GaAs | $Al_{x2}Ga_{1-x2}As$ | | InGaAs | InGaAs | InGaAsP |

The thickness $l_1$ of the first material layer M1 is determined so as to allow the existence of the two-dimensional excitons and is generally set below about 300 Å. The thickness $l_2$ of the second material layer M2 for allowing tunneling of the electrons therethrough is generally set equal to or below about 100 Å. The thickness $l_3$ of the third material layer M3, on the other hand, is allowed to have a relatively wide range for receiving the electrons formed in the first layer M1 and is generally set equal to or below about 1000 Å.

Next, an eighth embodiment of the present invention will be described with reference to FIGS.25(A) and 25(B).

Figure 25A:
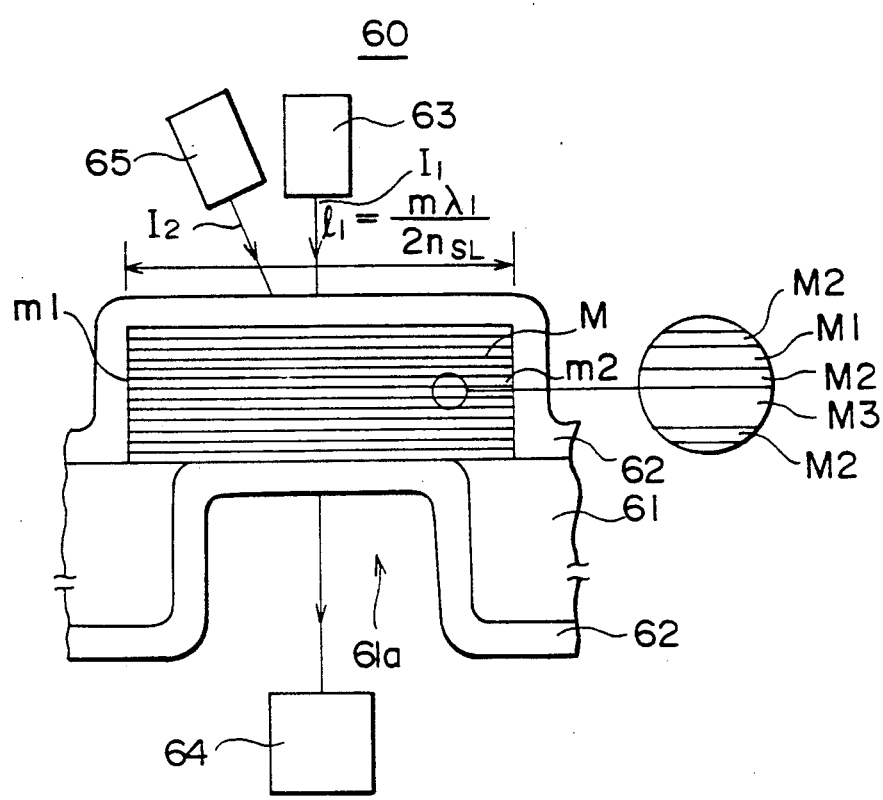
FIGS.25A and 25(B) are diagrams respectively showing the structure and band diagram of the non-linear semiconductor optical device according to an eighth embodiment of the present invention.

Referring to FIG.25(A) showing the cross section of a non-linear semiconductor optical device 60 of the present embodiment, the device is constructed on an indium phosphide (InP) substrate 61 that is formed with a through hole 61a for passing the optical beam therethrough. Typically, the substrate 61 has a thickness of about 600 μm.

In correspondence to the through hole 61a, the stacked body M comprising the material layers M1-M3 as already described is provided on the upper major surface of the substrate 61 with a thickness of 1.1075 μm corresponding to sixty repetitions of the layers M1-M3 such that each material layer M1-M3 extends parallel with the upper major surface of the substrate 61. The stacked body M is formed to have a rectangular form with a pair of opposing mirror surfaces m1 and m2 separated from each other by a distance $l_1$ that is set to satisfy a relationship $$l_1 = m\lambda_1/2n_{sl}$$

where m represents an integer, $n_{sl}$ represents the refractive index of the stacked body M, and $\lambda_1$ represents the wavelength of optical radiation that is released upon the recombination of the electrons and the holes accumulated on the respective quantum levels L3 and L3' of the third material layer M3. The stacked body M is covered by a transparent dielectric film 62 having a laminated structure, and the same dielectric film 62 is used to cover the lower major surface of the substrate 61 including the side wall of the through hole 61a and the exposed bottom surface of the stacked body M. As the dielectric film 62, one may use the film described by Kinoshita el al. (S. Kinoshita. T. Sakaguchi, T. Ogawa and K. Iga, Japanese Journal of Applied Physics vol.26, 1987, p.410), which is incorporated herein as reference. Alternatively, a thin gold layer having a thickness of about 200 Å may be used instead of the dielectric film 62.

Further, a light emitting device 63 is provided to produce the information optical beam $I_1$ such that the optical beam $I_1$ enters substantially perpendicular to the plane of the layers of the stacked body M and exits through the opening 61a after passing through the stacked body M, and a corresponding detector 64 is provided to receive the optical beam $I_1$ thus passed through the stacked body M. Further, a second light emitting device 65 is provided to produce the control optical beam $I_2$ with an angle offset from the optical path of the optical beam $I_1$.

The first through third material layers M1-M3 forming the stacked body M may have a composition and a thickness close to those described previously with reference to the fifth embodiment of the present invention. More specifically, the first material layer M1 has the composition of $In_{0.53}Ga_{0.47}As$ and the thickness of 43.95 Å corresponding to fifteen atomic layers, the second material layer M2 has the composition of $In_{0.31}Al_{0.69}As_{0.82}Sb_{0.18}$ and the thickness of 26.4 Å corresponding to nine atomic layers, and the third material layer M3 has the composition of $In_{0.48}Ga_{0.52}As_{0.95}Sb_{0.05}$ and the thickness of 87.9 Å corresponding to thirty atomic layers. The last composition of the material layer M3 is slightly different from the composition of the layer M3 in the fifth embodiment.

Figure 25B:
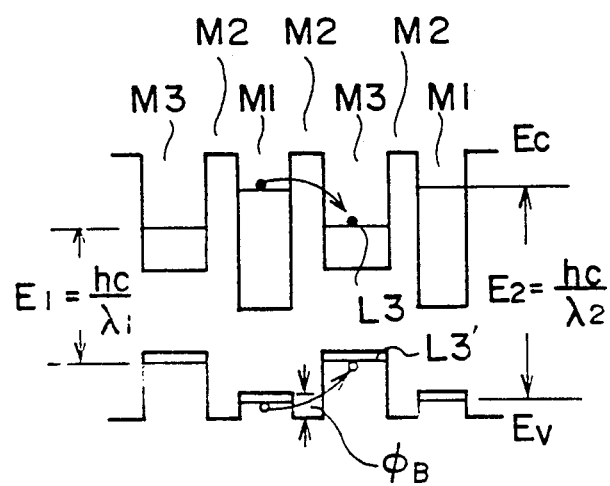

FIG.25(B) shows the band structure of the stacked body M of the device of FIG.25(A). The band diagram of this drawing is substantially identical with the band diagram of FIG.17(A) except that the barrier height $\phi_B$ of the valence band EV is reduced to about 0.1 eV. Thereby, the effective barrier height $E_H$ defined in FIG.17(C) is reduced substantially, and the holes cause tunneling through the second material layer M2 from the first material layer M1 to the third material layer M3 efficiently. It should be noted that the probability of tunneling of the holes through a potential barrier having a barrier height $\phi_B$ is given as $$T = \alpha \exp(-2kd)$$

where $\alpha$ is a constant, d represents the thickness of the barrier, and k is given by $$k = (2m^*\phi_B)^{\frac{1}{2}}/h$$

in which $m^*$ represents the effective mass of a hole and h represents the Planck's constant divided by $2\pi$. With the reduced barrier height $\phi_B$, one can see that the probability of tunneling of holes increases.

In the structure of FIG.25A, it should be noted that the stacked body M is formed to have a pair of mirror surfaces m1 and m2 with a separation 11 as defined previously. The mirror surfaces m1 and m2 are not necessarily be the surface provided with reflectors but may be a mere surface that is covered by the dielectric film 62.

In such a structure, it will be understood that the accumulation of the electrons and holes in the respective quantum levels of the third material layer M3 causes a laser oscillation in the cavity that is defined in the stacked body M by the mirror surfaces m1 and m2. See the band diagram of FIG.25(B). More specifically, when there is an excitation of the electrons and holes in the first material layer M1 in response to the repeated irradiation of the control optical beam $I_2$ from the light emitting device 65, the excited electrons and holes are accumulated in the respective quantum levels L3 and L3' after tunneling through the second material layer M2. There, when the concentration of the electrons and holes on the quantum levels L3 and L3' reaches the level of about $10^{12} cm^{-2}$, a light is emitted in response to the recombination of the electrons and the holes with the wavelength $\lambda_1$ that corresponds to an energy difference $E_1$ between the quantum level L3 and the quantum level L3'. The light thus emitted in turn induces the recombination of the electrons and holes, and there occurs a stimulated emission of the light having the same wavelength $\lambda_1$. Thereby, the amplification of the light and hence the laser oscillation occurs, and the electrons and holes at the quantum levels L3 and L3' are annihilated at high speed. Thereby, the accumulation of carriers above about $10^{12} cm^{-3}$ does not occur, and the device 60 maintains an excellent response even after a repeated irradiation of the control optical beam $I_2$ for a prolonged time period.

Figure 26:
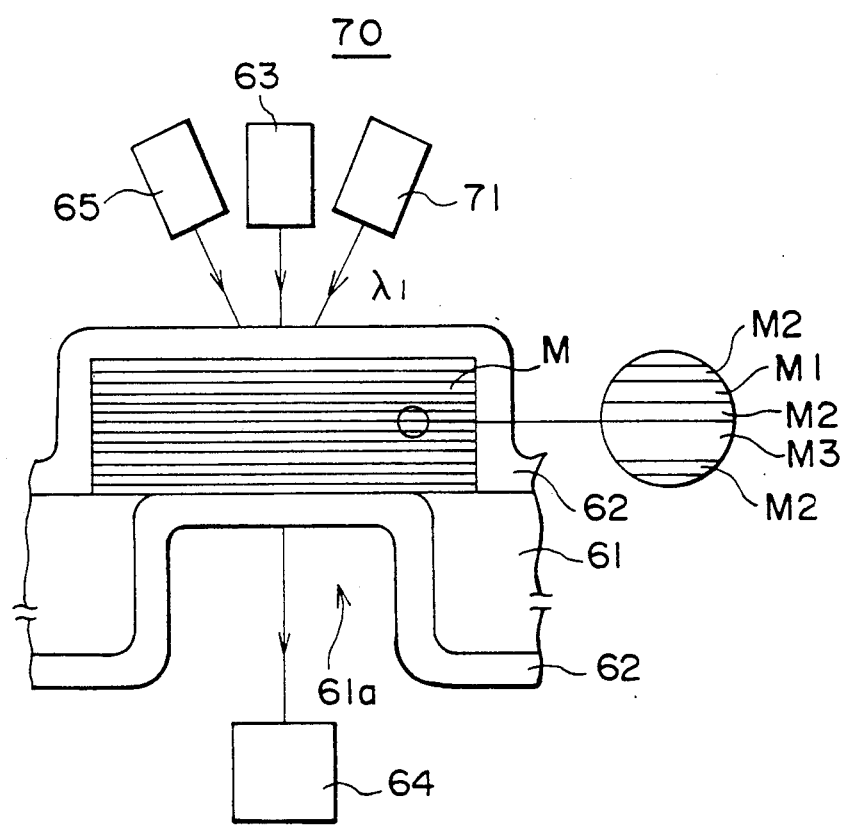
FIG.26 is a diagram showing the structure of the non-linear semiconductor optical device according to a ninth embodiment of the present invention.

Next, a ninth embodiment of the present invention will be described with reference to FIG.26. In FIG.26, the parts that correspond to those parts described previously with reference to FIGS.25(A) and 25(B) are designated by the same reference numerals and the description thereof will be omitted.

In the present embodiment, the restriction about the length $l_1$ of the stacked body M is not imposed. Thus, there will be no spontaneous laser oscillation to annihilate the electrons and holes accumulated on the quantum levels L3 and L3' of the layer M3 in the present embodiment. Instead, the present embodiment employs a laser 71 that produces a light beam having the wavelength $\lambda_1$ in coincidence to the energy difference E1 between the quantum level L3 and the quantum level L3'. Thereby, the stimulated emission is induced by the light beam from the laser 71, and the electrons and holes are annihilated similar to the eighth embodiment.

Next an optically bistable laser diode 80 in which the non-linear semiconductor optical device described heretofore is used as the saturable absorption region will be described with reference to FIGS.27(A)–27(C), as a tenth embodiment of the present invention.

Figure 27A:
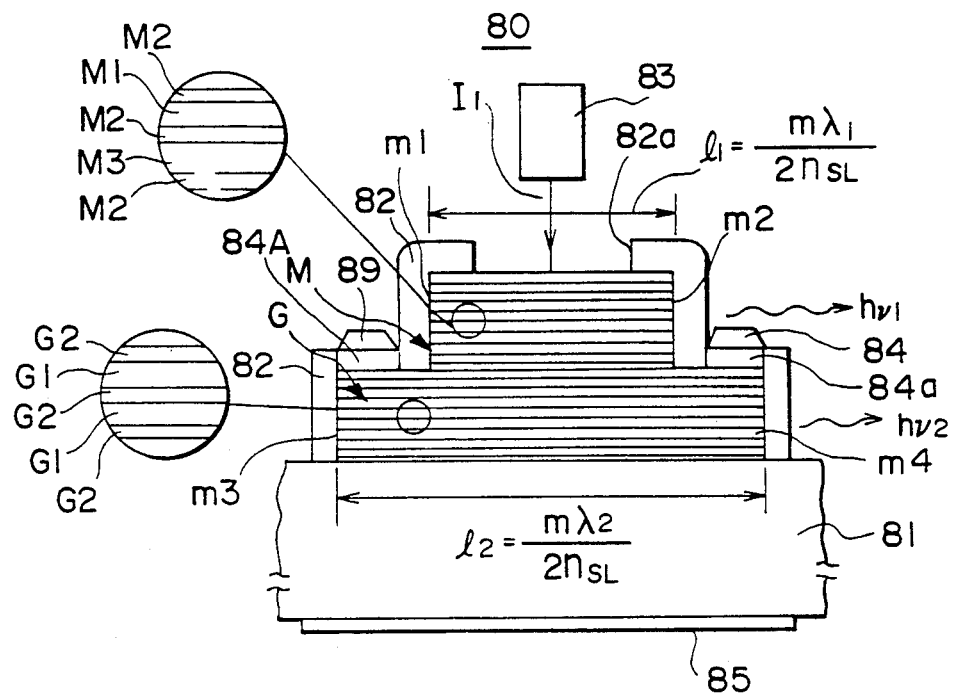
FIGS.27(A)–27(C) are diagrams showing the structure and band diagram of a bistable laser diode according to a tenth embodiment of the present invention.
Figure 27B:
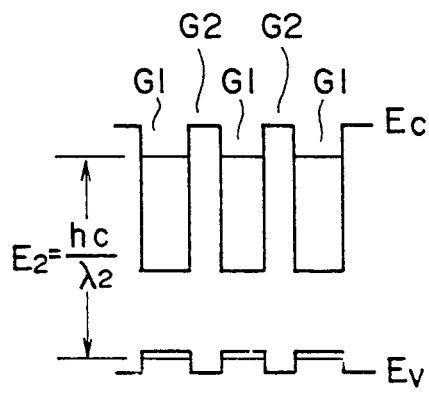
Figure 27C:
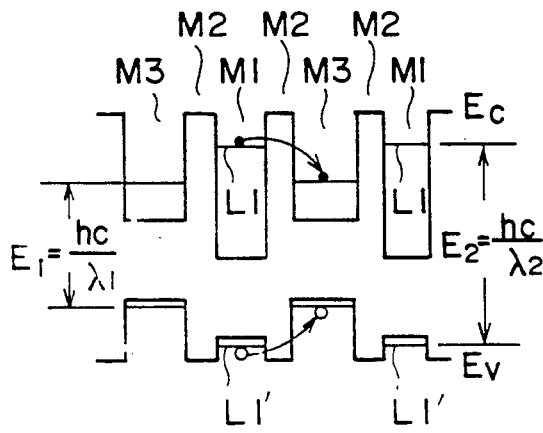

Referring to FIG.27(A), the laser diode 80 is constructed on an n-type InP substrate 81 that may have a thickness of about 600 μm. On the upper major surface of the substrate 1, a stacked body G of semiconductor layers is provided as the gain region of the laser diode 80. Referring to FIG.27(A), the stacked body G includes a first material layer G1 and a second material layer G2 stacked with each other alternately and repeatedly, wherein the second material layer G2 has a band gap that is substantially larger than the band gap of the first material layer G1 and the stacked body G forms a multiple quantum well (MQW) structure.

On the upper major surface of the stacked body G, there is provided the stacked body M described previously with reference to the fifth or eighth embodiment. Thus, the stacked body M comprises the first through third material layers M1–M3, wherein the first material layer M1 has the composition of $In_{0.53}Ga_{0.47}As$ and the thickness of 43.95 Å in correspondence to fifteen atomic layers, the second material layer M2 has the composition of $In_{0.31}Al_{0.69}As_{0.82}Sb_{0.18}$ and the thickness of 26.4 Å in correspondence to nine atomic layers, and the third material layer M3 has the composition of $In_{0.48}Ga_{0.52}As_{0.95}Sb_{0.05}$ and the thickness of 87.9 Å in correspondence to thirty atomic layers. As in the eighth embodiment, the stacked body M is bounded by a pair of mirror surfaces m1 and m2 that are separated from each other by the distance $l_1$. Thereby, the stacked body M has a band structure shown in FIG.27(C) similar to the previous embodiments.

The both stacked bodies G and M are covered by a transparent dielectric film 82 corresponding to the dielectric film 62 of the previous embodiments, wherein the dielectric film 82 covering the upper major surface of the stacked body M is provided with an opening 82a for exposing the upper major surface of the stacked body M, and a laser 83 tuned to the wavelength $\lambda_1$ irradiates the exposed upper major surface of the stacked body M by the output optical beam that acts as the control optical beam $I_1$. Further, the dielectric film 82 exposes the upper major surface of the stacked body G for a portion that is not covered by the stacked body M, and an upper electrode 84 is provided in ohmic contact with the exposed upper major surface of the stacked body G via a p+-type InP clad layer 84a. Furthermore, a lower electrode 85 is provided in ohmic contact with the lower major surface of the substrate 81.

Next, the construction of the stacked body G will be described.

As already described, the stacked body G includes an alternate repetition of the first material layer G1 and the second material layer G2. The material layer G1 has the composition and thickness identical with the composition and thickness of the material layer M1, while the material layer G2 has the composition and thickness identical with the composition and thickness of the material layer M2. In the present embodiment, the stacked body G has the thickness of 2039 Å in correspondence to twenty nine repetitions of the layers G1 and G2.

As will be easily understood from the fact that the first and second material layers G1 and G2 of the stacked body G has the same composition and thickness of the first and second material layers M1 and M2 of the stacked body M, the quantum levels appearing in the material layer G1 as a result of the lateral confinement by the material layer G2 assume the same energy levels as the quantum levels in the material layer M1. See the band diagram of FIG.25(B) that shows 1 the band structure of the stacked body G taken along the vertical cross section. Thus, when there is a laser oscillation as a result of the current injection into the gain region G via the electrodes 84 and 85, the produced light has a wavelength $\lambda_2$ that corresponds to the energy difference $E_2$ between the quantum level L1 and the quantum level L1' of the material layer M1.

In order to establish a laser oscillation at the wavelength $\lambda_2$, the stacked body G is bounded by a pair of mirror surfaces m3 and m4 that are separated from each other by a distance $l_2$, wherein the distance $l_2$ is set to satisfy the relationship $$l_2 = m\lambda_2 2n_{sl},$$

where m is an integer and $n_{sl}$ represents the refractive index of the stacked body G. Thus, the optical radiation is amplified while propagating through the stacked body G back and forth between the mirrors m3 and m4, and outputted as illustrated schematically in FIG.27(A) by $h\nu_2$ with the wavelength $\lambda_2$. In the present embodiment, one obtains the wavelength $\lambda_2$ of about 1.30 μm.

In the laser diode 80 of FIG.27(A), it should be noted that a substantial part of the optical beam enters into the saturable absorption region provided by the stacked body M. As the wavelength 2 of the optical beam produced by the gain region G causes a resonance with the quantum states L1 and L1' of the material layer M1 of the stacked body M, the optical beam produced by the gain region G is absorbed by the material layer M3. It should be noted that the control optical beam $I_1$ causes the absorption saturation of light in the material layer M1. Thus, when the laser 83 is turned on, the absorption of the output optical beam of the gain region G by the saturable absorption region M is reduced and the gain of the laser diode 80 as a whole is increased. On the other hand, when the laser 83 is turned off, the absorption of the output optical beam by the saturable absorption region M is increased and the gain of the laser diode 80 decreases. In other words, the output state of the laser diode 80 is controlled bistably by the laser 83 that controls the absorption of the saturable absorption region provided by the stacked body M.

Figure 28A:
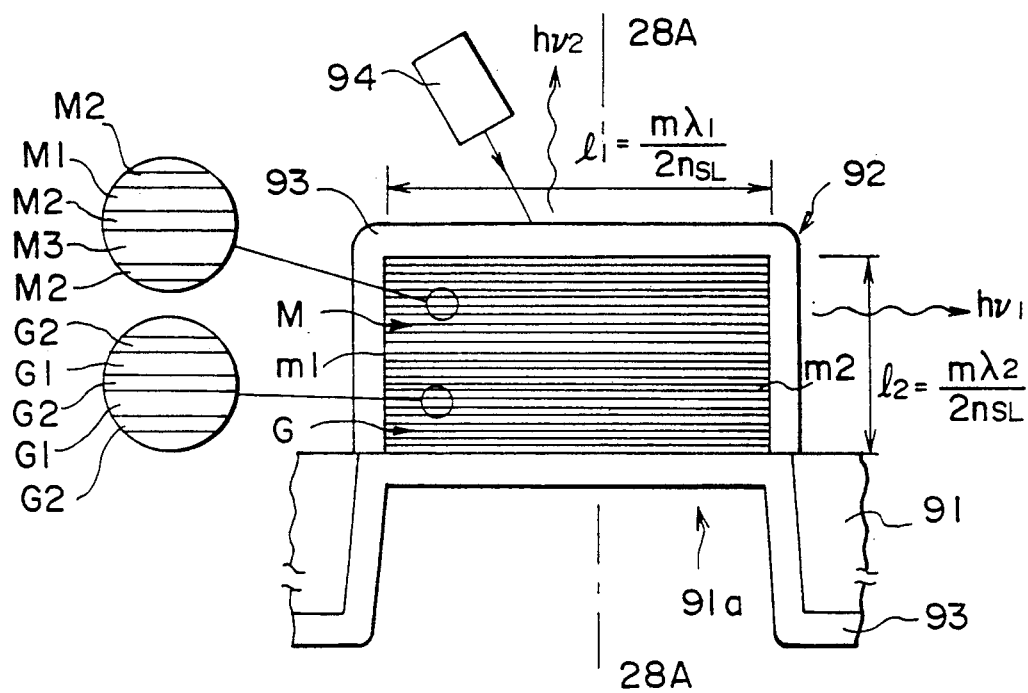
FIGS.28(A) and 28(B) are diagrams showing the structure of the bistable laser diode according to an eleventh embodiment of the present invention respectively in the transverse and longitudinal cross sections.
Figure 28B:
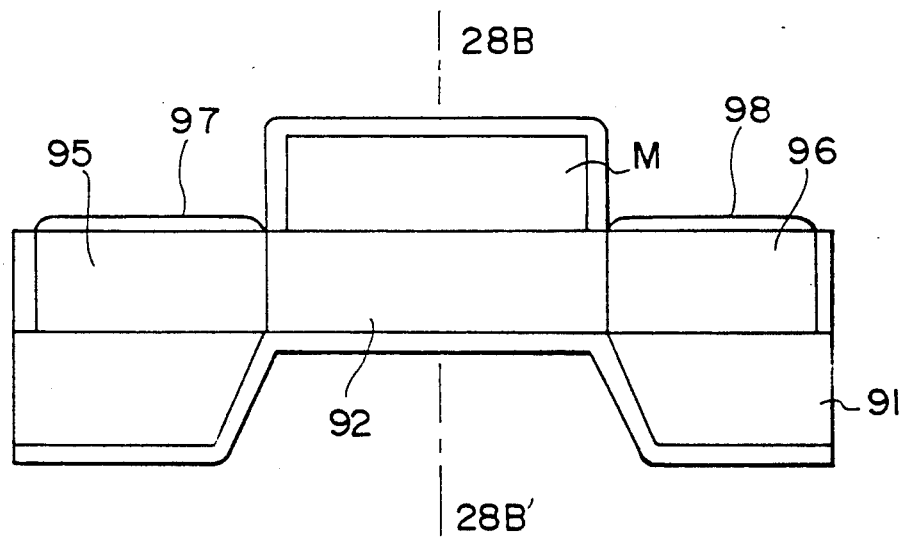

FIGS.28(A) and 28(B) show a bistable laser diode 90 according to an eleventh embodiment of the present invention, wherein FIG.28(A) shows a transverse cross section and FIG.28(B) shows a longitudinal cross section.

Referring to the drawings, the bistable laser diode 90 is constructed on a semi-insulating InP substrate 91 that may have a thickness of about 600 μm.

The substrate 91 is formed with a through opening 91a for passing the output optical beam, and the active region 92 of the laser diode is formed on the substrate 91 in correspondence to the opening 91a. The active region 92 includes a gain region and a saturable absorption region as usual in the optical bistable lasers, wherein the gain region is provided by the stacked body G similar to the previous embodiment. The present invention differs from the previous embodiment in the point that the stacked body M is provided on the upper major surface of the stacked body G such that the output optical beam of the laser diode is emitted vertically to the upper major surface of the stacked body G. It should be noted that the stacked body G and the stacked body M have the same composition and band structure described with reference to FIGS.2-7(A)–27(C). Further, the cross sectional view of FIG.2-8(A) shows that active region 92 is covered by a transparent dielectric film 92. The dielectric film 92 corresponds to the dielectric film 62 of FIG.26 and covers also the bottom surface of the substrate 91 as well as the exposed bottom surface of the stacked body G.

In the present embodiment, it should be noted that the active region 92 has a thickness $l_2$ that is set to satisfy the foregoing relationship of $$l_2 = m\lambda_2/2n_{sl}$$

to provide the cavity that establishes a resonance with the output optical beam having the wavelength $\lambda_2$ by reflecting the optical beam back and forth between the upper major surface of the stacked body M and the lower major surface of the stacked body G. Further, the active region 92 is shaped to have a pair of opposing mirror surfaces m1 and m2 that are separated by a distance $l_1$, wherein the distance $l_1$ is set to satisfy the foregoing relationship of $$l_1 = m\lambda_1/2n_{sl}$$

annihilate the accumulated electrons and holes from the quantum levels L3 and L3' of the material layer M3. In order to facilitate the annihilation of the electrons and holes by the stimulated emission, a laser 94 is provided to irradiate the stacked body M by the optical beam having the wavelength $\lambda_1$. Thus, when the laser 94 is turned on, the electrons and holes created in the material layer M3 of the stacked body M and the stacked body M saturates the absorption of the optical beam produced by the gain region G. Thereby, the laser diode assumes a high output state. When the laser 94 is turned off, on the other hand, electrons and holes in the material layer M3 is reduced and the stacked body M forming the saturable absorption region recovers the absorption. Thereby, the output of the bistable laser diode changes to the low level state.

FIG.28(B) shows the cross sectional view of the bistable laser diode 90 taken along the cross section perpendicular to FIG.28(A). As can be seen in FIG.28(B), an n+-type clad region 95 is provided at one side of the active region 92 in contact thereto and a p+-type clad region 96 is provided at the other side of the region 92 also in contact thereto. The regions 95 and 96 may be formed by the ion implantation of the n-type dopants and the p-type dopants into respective regions of the stacked body G. Further, electrodes 97 and 98 are provided respectively on the clad regions 95 and 96 in ohmic contact thereto, and the injection of the carriers into the gain region is achieved via the electrodes.

FIGS.29(A)–29(D) show a high speed laser diode according to a twelfth embodiment of the present invention.

Figure 29A:
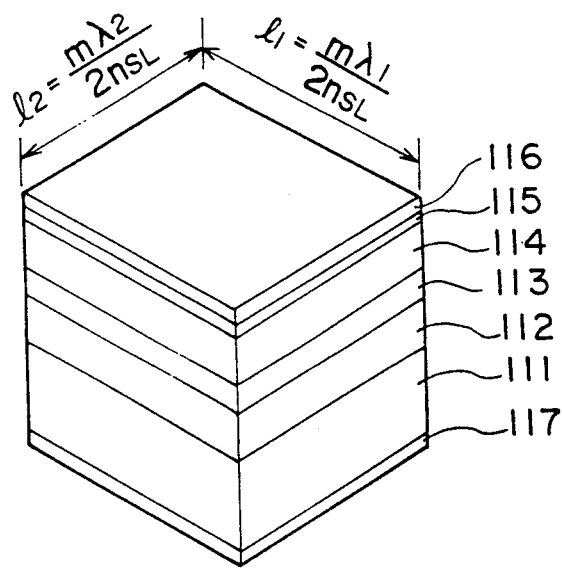
FIGS.29(A)–29(D) are diagrams showing the structure and band diagram of the bistable laser diode according to a twelfth embodiment of the present invention.

Referring to FIG.29(A), the laser diode comprises a layered semiconductor body 110 that is constructed on an n-type InP substrate 111. More specifically, the layered semiconductor body 110 includes an InP buffer layer 112 grown on the substrate 111 and an active layer 113 grown on the buffer layer 112. As will be described later, the active layer 113 includes a number of quantum well wires acting as the gain region. On the active layer 113, a p-type InP clad layer 114 is provided and a p+-type InGaAs contact layer 115 is provided on the clad layer 114. Further, a p-type electrode 116 is provided on the contact layer 115 in ohmic contact. On the other hand, the an n-type electrode 117 is provided on the bottom surface of the substrate 111.

The semiconductor body 110 has a rectangular form when viewed in the direction perpendicular to the substrate 117, wherein the first edge of the semiconductor body 110 has a length set to the foregoing length $l_1$. On the other hand, the second edge intersecting perpendicular to the first edge has a length set to the foregoing length $l_2$. Thus, the semiconductor body 110 provides a cavity that causes resonance with the optical beam having the wavelength $\lambda_1$ and propagating in the direction of the first edge. Simultaneously, the semiconductor body 110 provides a cavity that causes a resonance with the optical beam having the wavelength $\lambda_2$ and traveling in the direction of the second edge.

Figure 29B:
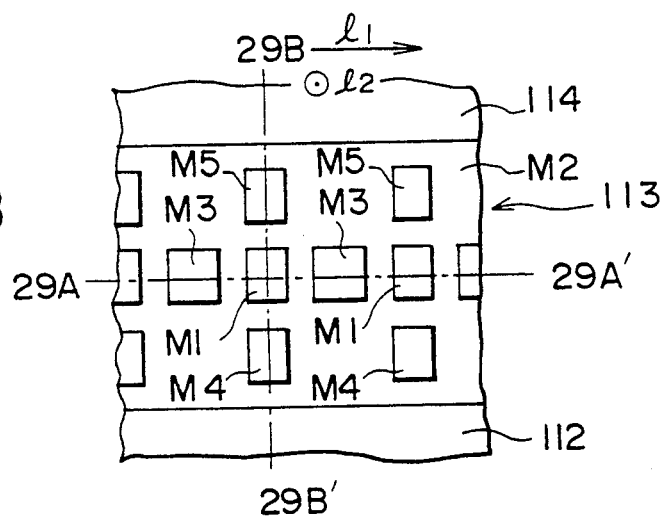

FIG.29(B) shows the quantum well wires formed in the active layer 113 in detail.

Figure 29C:
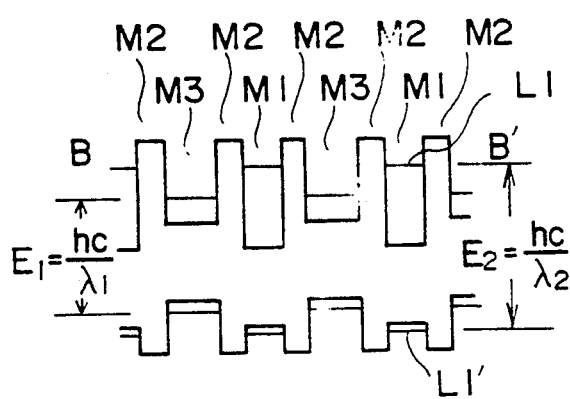

Referring to FIG.29(B), the active layer 113 includes the material layer M2 sandwiched between the buffer layer 112 and the clad layer 114, and a quantum well wire M3 having the same composition as the composition of the material layer M3 of the previous embodiments and a quantum well wire M1 having the same composition as the composition of the material layer M1 of the previous embodiments, are disposed alternately along the line 29A-29A' shown in FIG.29(B). More particularly, the quantum well wire M1 having the composition of $In_{0.53}Ga_{0.47}As$ and the thickness of 43.95 Å in the lateral direction of FIG.29(B) and the quantum well wire M3 having the composition of $In_{0.48}Ga_{0.52}As_{0.95}Sb_{0.05}$ and the thickness of 87.9 Å in the lateral direction of the drawing, both extending in the direction perpendicular to the plane of the drawing and having a thickness of 87.9 Å in the vertical direction of the drawing, are provided alternately and repeatedly in the material layer M2 that has the composition of $In_{0.31}Al_{0.69}As_{0.82}Sb_{0.18}$. Thereby, the band structure shown in FIG.29(C) is obtained for the cross section along the line 29A-29A', wherein the quantum well wire M1 and the quantum well wire M3 are separated from each other in the direction of the line 29A-29A' by a distance of 26.4 Å. It should be noted that the band structure of FIG.29(C) is identical with the band structure of FIG.25(B) or FIG.27(C).

Figure 29D:
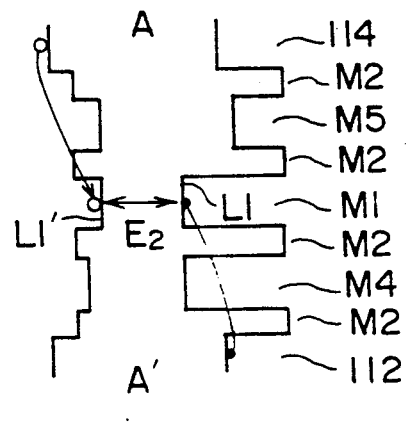

In FIG.29(B), it should be noted that there is provided a quantum well wire M4 of a composition $In_{0.53}Al_{0.05}Ga_{0.42}As$ in correspondence to and immediately below each quantum well wire M1. The quantum well wire M4 thereby has a lateral thickness, measured laterally in FIG.29(B), of 43.95 Å and a vertical width measured vertically in the drawing of 87.9 Å. Further, a quantum well wire M5 of a composition $In_{0.49}Al_{0.14}Ga_{0.37}As_{0.97}Sb_{0.03}$ is provided in correspondence to and immediately above each quantum well wire M1 with the size identical with the quantum well wire M4. Thereby, the quantum well wire M4 and the quantum well wire M5 are separated from the quantum well wire M1 by a distance of 26.4 Å. Thereby, a band diagram shown in FIG.29(D) is obtained for the cross section taken along the line 29B-29B'.

In operation, the electrons are injected from the n-type InP buffer layer 112 into the material layer M1 after crossing the material layer M2 and the quantum well wire M4, wherein the electrons cross the potential barrier of the material layer M2 by the tunneling. Similarly, the holes are injected from the p-type clad layer 114 after crossing the material layer M2 and the quantum well wire M5. Thereby, the electrons and holes are accumulated in the respective quantum levels L1 and L1' of the material layer M1. As already noted, the quantum levels L1 and L1' are separated from each other by the energy difference E2, and the laser diode cause an emission of light that is amplified by the cavity extending for the length $l_2$ ($=m\lambda_2/2n_{sl}$). See FIG.29(A).

Simultaneously to the accumulation, the electrons and holes are removed, in the laser diode of the present invention, from the material layer M1 and transported to the material layer M3. There, they are annihilated by causing recombination that releases the optical beam of the wavelength of $\lambda_1$ as described with reference to previous embodiments. It should be noted that the recombination is facilitated by the stimulated emission that in turn is facilitated by the cavity having the size of $l_1$. See FIG.29(A).

Thus, whenever the injection of the drive current via the electrodes 116 and 117 is interrupted, the carriers are depleted from the material layer M1 and the oscillation of the laser diode stops immediately. In other words, one can stop the laser oscillation in an extremely short time, in the matter of 1-10 picoseconds.

The structure of FIG.29(B) can be formed by the process similar to the one described with reference to FIGS.20(A)-20(H).

Figure 30A:
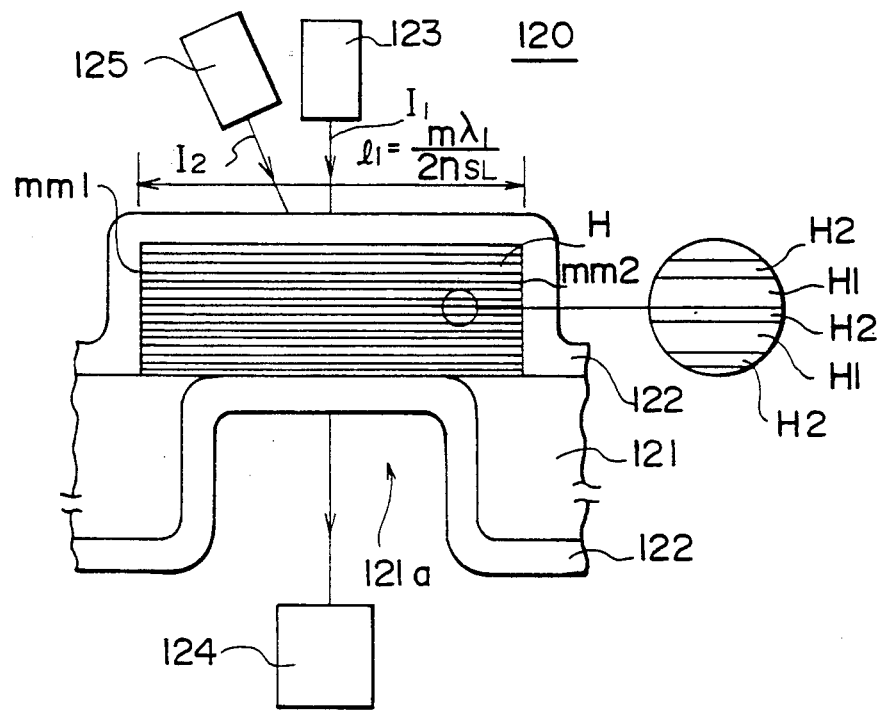
FIGS.30(A) and 30(B) are diagrams showing the structure and band diagram of a non-linear semiconductor optical device according to a thirteenth embodiment of the present invention.
Figure 30B:
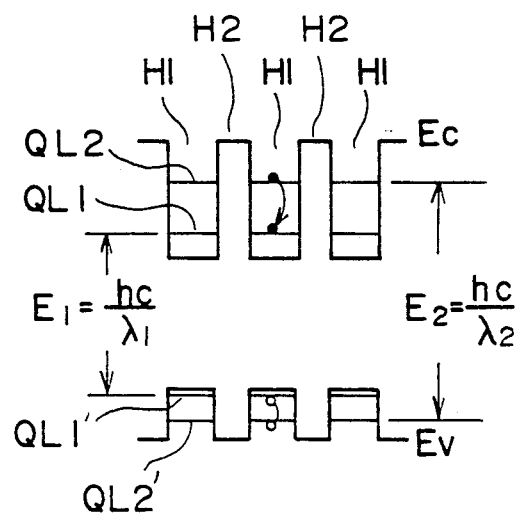

FIGS.30(A) and 30(B) show a non-linear semiconductor optical device 120 according to still another embodiment of the present invention.

In this embodiment, the non-linear semiconductor optical device is constructed on a GaAs substrate 121 having a thickness of about 500 μm and includes a stacked body H. The stacked body H includes an alternate repetition of active layers H1 and barrier layers H2 stacked parallel with each other and parallel to the upper major surface of the substrate 121. There, each active layer H1 has a composition of GaAs and a thickness of 90.56 Å corresponding to thirty two atomic layers while each barrier layers H2 has a composition of $Al_{0.51}Ga_{0.49}As$ and a thickness of 39.62 Å corresponding to fourteen atomic layers.

Further, the stacked body H is shaped to have a rectangular form when viewed in the direction perpendicular to the upper major surface of the substrate, wherein the stacked body H is bounded by a pair of opposing side walls mm1 and mm2 acting as mirror surfaces. The distance between the mirror surfaces mm1 and mm2 is set equal to the length $l_1$ that is defined as $$l_1 = m\lambda_1/2n_{sl},$$

as already described. Thereby, a cavity is formed in the stacked body H that establishes a resonance with the optical beam having the wavelength $\lambda_1$ and propagating back and forth between the mirror surfaces mm1 and mm2.

The stacked body H is covered by a dielectric film 122 corresponding to the dielectric film 62 of the embodiment of FIG.25(A). Further, an opening 121a is provided on the substrate 121 to expose the bottom surface of the stacked body H, and the bottom surface of the substrate is covered by the same dielectric film 122, including the side wall of the opening 121a.

Similar to the embodiment of FIG.25(A), there is provided a light emitting device 123 corresponding to the light emitting device 63 for producing the information optical beam $I_1$ such that the information optical beam enters into the stacked body in correspondence to the region of the body H located on the opening 121a, with a direction perpendicular to the upper major surface of the stacked body H. Further, in to receive the optical beam $I_1$ passed through the stacked body H, there is provided a detector 124 corresponding to the detector 64 of FIG.25(A). It should be noted that the light emitting device 63 produces the information optical beam $I_1$. Further, there is provided a light emitting device 125 that corresponds to the light emitting device 65 of FIG.25(A) for producing the control optical beam $I_2$, such that the control optical beam $I_2$ enters into the stacked body with an angle offset from the optical path of the information optical beam $I_2$.

FIG.30(B) shows the band structure of the stacked body H taken along the vertical cross section.

Referring to FIG.30(B), there are formed discrete quantum levels QL1 and QL2 in the material layer H1 for the electrons, wherein the level QL1 represents the ground state and the level QL2 represents the excited state. Similarly, there are formed discrete quantum levels QL1' and QL2' for the holes, wherein the level QL1' represents the ground state and the level QL2' represents the excited state. It should be noted that there is an energy difference equal to the energy difference E1 between the quantum levels QL1 and QL1'. Similarly, there is an energy difference equal to the energy difference E2 between the quantum levels QL2 and QL2'.

When the control optical beam $I_2$ is irradiated, the refractive index of the material layer M1 near the energy E2 is changed, and the transparency of the input light $I_1$ is significantly changed. There, the electrons and holes thus excited to the quantum levels QL2 and QL2' lose the energy by the relaxation and fall into the quantum levels QL1 and QL1'. As the quantum levels QL1 and QL1' are separated energetically by the energy difference E1, the light emitted by the recombination of the electrons and holes at the quantum levels QL1 and QL1' has the wavelength that causes resonance in the stacked body H. Thereby, the electrons and holes are quickly annihilated by the stimulated emission. Thus, whenever the control optical beam $I_2$ is interrupted, the electrons and holes at the quantum levels QL2 and QL2' are quickly removed and the stacked body H resumes the initial state of the transparency of the information optical beam $I_1$. Thus, the non-linear semiconductor optical device of the present invention operates at an extremely fast speed.

Further, the present invention is not limited to the embodiments described heretofore, but various variations and modifications may be made without departing from the scope of the invention.

WHAT IS CLAIMED IS:

1. An optical semiconductor device for modulating an incident optical beam, comprising:

a quantum well layer having upper and lower major surfaces separated from each other by a first thickness, said quantum well layer comprising a first semiconductor material having a first band gap;

a first quantum level pair formed in said quantum well layer in correspondence to said first thickness, said first quantum level pair comprising a first quantum level for electrons and a second quantum level for holes separated from each other by a first energy gap;

said first thickness of the quantum well layer being determined such that said first energy gap corresponds to an energy of the incident optical beam to be modulated;

a first barrier layer each having upper and lower major surfaces separated from each other by a first barrier thickness, said first barrier thickness being chosen to allow the tunneling of electrons and holes through said first barrier layer, said first barrier layer comprising a second, different semiconductor material having a second band gap substantially larger than the first band gap, said first barrier layer being disposed above said first material layer;

a second barrier layer each having upper and lower major surfaces separated from each other by a second barrier thickness, said second barrier thickness being chosen to allow the tunneling of electrons and holes through said second barrier layer, said second barrier layer comprising a third semiconductor material having a third band gap that is substantially larger than the first band gap, said second barrier layer being disposed below said first material layer;

a carrier extinction layer having upper and lower major surfaces separated from each other by a second thickness larger than said first thickness, said carrier extinction layer being provided at least either one of above the first barrier layer that is located above the first material layer and below the second barrier layer that is located below the first material layer;

a second quantum level pair formed in said carrier extinction layer in correspondence to said second thickness, said second quantum level pair comprising a third quantum level for electrons and a fourth quantum level for holes separated from each other by a second energy gap that is smaller than said first energy gap; and carrier annihilating means for annihilating the electrons and holes on said third and fourth quantum levels of said carrier extinction layer by inducing a stimulated emission of light having an energy identical with the second energy gap.

2. An optical semiconductor device as claimed in claim 1 in which said quantum well layer, first and second barrier layers, and said carrier extinction layer are stacked repeatedly to form a layered semiconductor body, said layered semiconductor body being defined by a pair of opposing, flat surfaces that are separated from each other by a distance to cause a resonance with a light that is released by the recombination of electrons and holes at the third and fourth quantum levels of the carrier extinction layer, said carrier annihilating means comprising said opposing surfaces of the stacked body.

3. An optical semiconductor device as claimed in claim 2 in which said layered semiconductor body has a rectangular form, and said pair of opposing surfaces form opposing side walls of the layered semiconductor body.

4. An optical semiconductor device as claimed in claim 3 in which said layered semiconductor body is provided on an upper major surface of a substrate, said substrate having a lower major surface and a through opening that extends from the lower major surface to the upper major surface of the substrate, said layered semiconductor body being provided in correspondence to said through opening such that the optical beam passes through the penetrating opening.

5. An optical semiconductor device as claimed in claim 1 in which said carrier annihilating means comprises a laser that produces a coherent optical beam having an energy equal to the energy of the light that is released by the recombination of carriers on the third and fourth quantum levels of the carrier extinction layer.

6. An optical semiconductor device as claimed in claim 1 in which said first material layer has a composition of $In_{0.53}Ga_{0.47}As$, said second material layer has a composition of $In_{0.31}Al_{0.69}As_{0.82}Sb_{0.18}$, and said third material layer has a composition of $In_{0.48}Ga_{0.52}As_{0.95}Sb_{0.05}$.

7. An optical semiconductor device as claimed in claim 6 in which said first thickness is set to about 43.95 Å, said second thickness is set to about 26.4 Å, and said third thickness is set to about 87.9 Å.

8. An optical semiconductor device as claimed in claim 1 in which said quantum well layer and said first and second barrier layers are chosen to have respective compositions such that there is formed a potential barrier in a valence band with a barrier height set that the probability of tunneling of the holes through any of the first and second barrier layers, from the quantum well layer to the carrier extinction layer is substantially identical with the probability of tunneling of the electrons through any of the first and second barrier layers, from the quantum well layer to the carrier extinction layer.

9. A bistable laser diode, comprising:

a gain region for amplifying optical radiation having a first wavelength to produce an output optical beam;

a saturable absorption region for absorbing said optical radiation to suppress the amplification of the optical beam of the gain region said saturable absorption region reducing the absorption in response to irradiation of a control optical beam;

said saturable absorption region comprising a quantum well layer having upper and lower major surfaces separated from each other by a first thickness, said quantum well layer comprising a first semiconductor material having a first band gap;

a first quantum level pair formed in said quantum well layer in correspondence to said first thickness, said first quantum level pair comprising a first quantum level for electrons and a second quantum level for holes separated from each other by a first energy gap;

said first thickness of the first material layer being determined such that said first energy gap corresponds to the first wavelength of the optical radiation that is amplified in the gain region;

a first barrier layer having upper and lower major surfaces separated from each other by a second thickness chosen to allow the tunneling of electrons and holes through said first barrier layer, said first barrier layer comprising a second semiconductor material having a second band gap larger than the first band gap and disposed above said quantum well layer;

a second barrier layer having upper and lower major surfaces separated from each other by a third thickness chosen to allow the tunneling of electrons and holes through said second barrier layer, said second carrier layer comprising a third semiconductor material having a third band gap larger than the first band gap and disposed below said quantum layer;

said first and second barrier layers forming a potential well in the quantum well layer for confining electrons and holes;

a carrier extinction layer having upper and lower major surfaces separated from each other by a fourth thickness larger than said first thickness, said carrier extinction layer being provided at least either of above the first barrier layer and below the second barrier layer;

a second quantum level pair formed in said carrier extinction layer in correspondence to said third thickness, said second quantum level pair comprising a third quantum level for electrons and a fourth quantum level for holes separated from each other by a second energy gap that is smaller than said first energy gap; and carrier annihilating means for annihilating the electrons and holes from said third and fourth quantum levels by inducing a stimulated emission of light that has an energy identical with the second energy gap.

10. A bistable laser diode as claimed in claim 9 in which said gain region has a rectangular form defined by upper and lower major surfaces, said saturable absorption region also having a rectangular form defined by upper and lower major surfaces, said saturable absorption region being provided on said upper major surface of the gain region, said gain region having a first pair of opposing side walls acting as mirror surfaces and separated from each other by a first distance, said first distance being set such that there is formed a cavity that causes a resonance gain region, said saturable absorption region having a second pair of opposing side walls acting as mirror surfaces and separated from each other by a second distance, said second distance being set such that there is formed a cavity that causes a resonance with the light that is released by the carrier annihilating means as a result of the recombination of the electrons and holes on the third and fourth quantum levels in the carrier extinction layer, said carrier annihilating means comprising said second pair of opposing side walls of the saturable absorption region.

11. A bistable laser diode as claimed in claim 10 in which said carrier annihilating means further comprises a laser that produces a coherent optical beam with an energy that is equivalent with the energy of the light that is released by the carrier annihilating means as a result of the recombination of the electrons and holes on the third and fourth quantum levels in the carrier extinction layer, said laser irradiating the upper major surface of the saturable absorption region with said coherent optical beam.

12. A bistable laser diode as claimed in claim 9 in which said gain region has upper and lower major surfaces, said saturable absorption region has upper and lower major surfaces and provided on the upper major surface of the gain region to form an active layered body, said active layered body being defined by an upper major surface coincident to the upper major surface of the saturable absorption region, and a lower major surface coincident to the lower major surface of the gain region, said upper and lower major surfaces of said active layered body acting as mirror surfaces and separated from each other with a distance to form a cavity that establishes a resonance with the optical radiation amplified in the gain region.

13. A bistable laser diode as claimed in claim 12 in which said active layered body is formed into a rectangular shape when viewed in the direction perpendicular to the upper major surface of the active layered body such that said active layered body is defined by a pair of opposing side walls, said pair of opposing side walls acting as mirror surfaces and separated from each other by a distance set such that said active layered body forms a cavity for establishing a resonance with the light that is released by the recombination of the electrons and holes on said third and fourth quantum levels in said carrier extinction layer, said carrier annihilating means comprises said side walls of the active layered body.

14. A bistable laser diode as claimed in claim 13 in which said carrier annihilating means comprises a laser that produces said control optical beam with a wavelength corresponding to the energy of the light that is released by the carrier annihilating means upon the recombination of the electrons and holes on the third and fourth quantum levels in said carrier extinction layer.

15. A bistable laser diode as claimed in claim 14 in which said laser produces the control optical beam such that the control optical beam irradiates the upper major surface of the active layered body.

16. A laser diode, comprising:

a first clad layer of a first conductivity type, said first clad layer having upper and lower major surfaces;

a first electrode provided on the lower major surface of the first clad layer;

an active layer having upper and lower major surfaces and provided on the upper major surface of the first clad layer;

a second clad layer of a second, opposite conductivity type, said second clad layer having upper and lower major surfaces and provided on the upper major surface of the active layer; and a second electrode provided on the upper major surface of the second clad layer;

said active layer comprising a material layer of a first material having a first band gap, said material layer having upper and lower major surfaces coincident to the upper and lower major surfaces of the active layer;

a first quantum well wire of a second material having a second band gap that is smaller than said first band gap, said first quantum well wire extending in a direction parallel to the upper and lower major surfaces of said material layer, said first quantum well wire having a first size in a direction perpendicular to the elongating direction of the first quantum well wire when measured in a plane that is parallel to the upper and lower major surfaces of the material layer, said first size being set such that there are formed a pair of quantum levels, one for electrons and one for holes, in said first quantum well wire such that said quantum levels are separated from each other by a first energy gap corresponding to an energy of an optical beam that is produced by the laser diode;

a second quantum well wire of a third material having a third band gap that is smaller than any of the first and second band gaps, said second quantum well wire extending parallel to said first quantum well wire at least one side of the first quantum well wire, such that the second quantum well wire is separated from the first quantum well wire by said first material forming the first material layer with a distance such that electrons and holes penetrate through the first material intervening between the first quantum well wire and the second quantum well wire, said second quantum well wire having a second size measured in the same direction as the first size, said second size being set such that there are formed a pair of quantum levels, one for electrons and one for holes, in said second quantum well wire such that the quantum levels in the second quantum well are separated from each other by a second energy gap that is substantially smaller than said first gap;

said active layer being formed into a rectangular shape when viewed perpendicular to said upper major surface of the active layer, said active layer being defined by a first side wall pair comprising a pair of parallel and opposing side walls each extending in a direction perpendicular to the direction in which the first and second sizes are measured, said pair of opposing side walls being separated from each other with a first distance such that said opposing side walls form a cavity in the active layer that establishes a resonance with a light having an energy corresponding to the second energy gap, said active layer being further defined by a second side wall pair comprising a pair of parallel and opposing side walls each extending in a direction perpendicular to the side walls forming said first side wall pair and perpendicular to the upper and lower major surfaces of the active layer, said side walls forming said second side wall pair being separated from each other by a second distance such that said opposing side walls of the second side wall pair form a cavity in the active layer that establishes a resonance with the optical beam that is produced by the laser diode.

17. A laser diode as claimed in claim 16 further comprising carrier injection means provided in the active layer between the first clad layer and the first quantum well wire, and between the second clad layer and the first quantum well sire for injecting carriers to the first quantum well wire.

18. A laser diode as claimed in claim 17 in which said carrier injection means comprises a third quantum well wire disposed between the first clad layer and the first quantum well wire, and between the second clad layer and the first quantum well wire, said third quantum well wire having quantum levels smaller than energies of the electrons and holes that are injected from the first and second clad layers.

19. An optical semiconductor device for modulating an incident optical beam, comprising: a first material layer having upper and lower major surfaces, said first material layer having a first band gap and a first thickness, said first thickness being determined such that there are formed at least a first quantum level pair and a second quantum level pair, said first quantum level pair comprising a first quantum level for electrons and a second quantum level for holes separated from each other by a first energy gap, said first thickness being determined such that said first energy gap coincides with an energy of the incident optical beam, said second quantum level pair comprising a third quantum level for electrons and a fourth quantum level for holes separated from each other by a second energy gap that is smaller than said first energy gap;

a second material layer having upper and lower major surfaces and provided on the upper major surface of the first material layer for confining electrons and holes in said first material layer, said second material layer having a second band gap that is substantially larger than the first band gap;

said first and second material layers being stacked alternately to form an active layered body having upper and lower major surfaces;

said active layered body being defined by a pair of opposing side walls that are separated from each other by a distance such that said opposing side walls form a cavity that establishes a resonance with an energy coincident to the first energy gap.

20. A semiconductor optical device having an optical transmittance and absorption changed in response to irradiation of an incident optical beam, comprising:

a first material layer having a first band gap and a first thickness set so as to allow existence of two-dimensional excitons interacting with the incident optical beam, said first material layer having an optical absorption coefficient that is changed in response to the incident optical beam and characterized by electrons and holes that assume one or more quantum levels;

a second material layer having a second band gap substantially larger than said first band gap and disposed at both sides of said first material layer, said second material layer having a second thickness for allowing a tunneling of the electrons in the first material layer therethrough; and a third material layer having a third band gap substantially smaller than said second band gap and provided at least on one side of the second material layer, said third material layer having a third thickness set such that the third material layer is characterized by electrons and holed that assume one or more quantum levels wherein all o the quantum levels of the electrons in the third material layer are energetically different from at least one of the quantum levels of the electrons in the first material layer, said third material layer having an optical absorption coefficient that is substantially smaller than the optical absorption coefficient of the first material layer.

21. A semiconductor optical device as claimed in claim 20 in which said first through third material layers form a structural unit, and said optical device has a superlattice structure comprising a repetition of said structural unit for a plurality of times.

22. A semiconductor optical device as claimed in claim 20 in which said first material layer comprises a material selected from a group consisting of gallium arsenide, indium gallium arsenide and indium gallium arsenide phosphide, said second material layer comprises a material selected from a group consisting of aluminum gallium arsenide, indium aluminum arsenide, indium aluminum arsenide antimonide and indium phosphide, and said third material layer comprises a material selected from a group consisting of gallium arsenide, aluminum gallium arsenide, indium gallium arsenide and indium gallium arsenide phosphide.

23. A semiconductor optical device as claimed in claim 20 in which said first thickness is chosen such that there is formed a quantum well structure of the electrons and holes wherein the electrons and the holes assume discrete quantum levels respectively at a conduction band and a valence band in the first material layer, said third thickness is chosen such that there is formed a quantum well structure of the electrons and holes wherein the electrons and the holes assume other discrete quantum levels respectively at the conduction band and the valence band in the third material layer and such that there exists at least one quantum level of the electrons in the third material layer of which energy is substantially lower than that of one quantum level of the electrons interacting with the incident optical beam in the first material layer.

24. A semiconductor optical device as claimed in claim 23 in which said first and third material layers have respective compositions and thicknesses chosen such that there exists an energy difference between the quantum level of the electrons and the quantum level of the holes in the third material layer which is substantially larger than that between the quantum level of the electrons interacting with the incident optical beam in the first material layer and the quantum level of the holes in the first material layer.

25. A semiconductor optical device as claimed in claim 20 in which said device is defined by a pair of side surfaces extending perpendicularly to the first, second and third layers, and a material having a composition identical with that of the second material layer is provided on said pair of side surfaces.

26. A semiconductor optical device as claimed in claim 20 in which said device is defined by a pair of side surfaces extending perpendicularly to the first, second and third layers, and a material having a composition identical with that of the second material layer is provided on said pair of side surfaces.

27. A semiconductor optical device as claimed in claim 26 in which said device is further defined by another pair of side surfaces extending perpendicularly to the first, second and third layers and further perpendicularly to said first side surfaces, and a material identical with that provided on the first side surfaces is provided on said second side surfaces.

28. A semiconductor optical device as claimed in claim 20 in which the device is defined by a front side and a rear side extending parallel to said first, second and third material layers and said device further comprises a pair of reflecting means at said front and rear sides.

29. A semiconductor optical device as claimed in claim 20 in which the quantum levels of the electrons and the holes in the third material layer are characterized by respective ground states separated energetically from each other by a first energy difference, and the quantum levels of the electrons and holes in the first material layer are characterized by respective ground states separated energetically from each other by a second energy difference, wherein the third material layer is formed such that the first energy difference is larger than the second energy difference.

30. A semiconductor optical device as claimed in claim 20 in which each first material layer and each said third material layer are segmented into a number of respective elongated regions extending parallel with each other in a first direction in a three-dimensional space, and said second material layer is formed to surround each elongated regions to form a two-dimensional quantum well wire extending in said first direction in each of said fist and third material layers, said quantum well sire is formed such that a probability of transition of electrons upon absorption of the incident optical beam is substantially smaller in the third material layer than in the first material layer.

31. A semiconductor optical device as claimed in claim 20 in which each first material layer and each third material layer are segmented into number of respective isolated regions isolated from each other in a three-dimensional space and surrounded in all three directions of the three-dimensional space by the second material layer to form a three-dimensional quantum box, said three-dimensional quantum box is formed such that a probability of transition of electrons upon absorption of the incident optical beam is substantially eliminated in the third material layer.

32. A semiconductor optical device having a refractive index changed responsive to irradiation of an incident optical beam, comprising:

a first material layer having a first band gap and a first thickness set so as to allow existence of a two-dimensional exciton interacting with the incident optical beam;

a second material layer having a second band gap substantially larger than said first band gap and disposed at both sides of said first material layer, said second material layer having a second thickness for allowing a tunneling of electron therethrough; and a third material layer having a third band gap substantially smaller than said second band gap and provided at least on one side of the second material layer, said third material layer having a third thickness set such that there are formed one or more quantum levels of electron all of which being energetically different from at least one of those formed in the first material layer;

said first thickness being chosen such that there is formed a quantum well structure wherein electrons and holes assume discrete quantum levels respectively at a conduction band and a valence band in the first material layer, said third thickness being chosen such that there is formed a quantum well structure wherein electrons and holes assume another discrete quantum levels respectively at the conduction band and the valence band in the third material layer and such that there exists at least one quantum level of electron in the third material layer of which energy is substantially lower than the that of one quantum level of electron interacting with the incident optical beam in the first material layer;

said first and second material layers having respective thicknesses and compositions chosen such that there exists an energy difference between the quantum level of the holes in the first material layer and a top edge of the valence band of the second material layer which is substantially reduced as compared to that between a bottom edge of the conduction band in the second material layer and said quantum level of the electrons interacting with the incident optical beam in the first material layer, so that tunneling of electron from the first material layer to the third material layer through the second material layer is facilitated.

33. A semiconductor optical device as claimed in claim 32 in which said energy difference between the quantum level of the holes and the top edge of the valence band is set equal to or smaller than about one-fifth of the energy difference between the quantum level of the electrons and the bottom edge of the conduction band.

34. An optical device having a variable reflectivity comprising a stacked body of an alternate repetition of a first optical layer having a first refractive index and a second optical layer having a second refractive index, wherein either one of the first and second optical layers comprises:
- a first material layer having a first band gap and a first thickness set so as to allow existence of two-dimensional excitons interacting with the incident optical beam;
- a second material layer having a second band gap substantially larger than said first band gap and disposed at both sides of said first material layer, said second material layer having a second thickness for allowing a tunneling of electron therethrough; and
- a third material layer having a third band gap substantially smaller than said second bandgap and provided at least on one side of the second material layer, said third material layer having a thickness set such that there are formed on or more quantum levels of electrons all of which being energetically different from at least one of those formed in the first material layer.

* * * * *

UNITED STATES PATENT AND TRADEMARK OFFICE
CERTIFICATE OF CORRECTION

PATENT NO. : 5,175,739

DATED : December 29, 1992

INVENTOR(S) : Atsushi TAKEUCHI et al.

It is certified that error appears in the above-identified patent and that said Letters Patent is hereby corrected as shown below:

Column 2, line 43, delete "creased" and insert --increased and the transmittance of the device is increased--; and
 line 65, change "buil" to --bulk--.

Column 6, line 14, after "the" (second occurrence) insert --absorption of an information optical beam by the third--.

Column 9, line 18, change "GA" to --Ga--.

Column 10, line 28, after "M1." insert --Note that the relationship between the quantum level--; and
 line 65, after "M1" insert --.--.

Column 12, line 13, after "other" insert --words, the direction of incidence of the optical beams"; and
 line 46, after "to" insert --another side facing the optical fiber 18b. Further, a--.

Column 13, line 14, after "first" insert --material--; and
 line 15, after "may" delete "material".

Column 17, line 48, change "[011]" to --[0$\bar{1}$1]--.

UNITED STATES PATENT AND TRADEMARK OFFICE
CERTIFICATE OF CORRECTION

PATENT NO. : 5,175,739

DATED : December 29, 1992

INVENTOR(S) : Atsushi TAKEUCHI et al.

It is certified that error appears in the above-identified patent and that said Letters Patent is hereby corrected as shown below:

Column 18, line 56, change "[011]" to --[0$\bar{1}$1]--.

Column 23, line 6, change "1" to --81--.

Column 24, line 30, change "wavelength $_2$" to --wavelength $\lambda_2$--.

Column 31, line 32, after "resonance" insert --with the optical radiation that is amplified in the--.

Column 33, line 40, change "sire" to --wire--.

Column 34, line 35, change "o" to --of--.

Column 35, line 62, change "fist" to --first--; and

UNITED STATES PATENT AND TRADEMARK OFFICE
CERTIFICATE OF CORRECTION

PATENT NO. : 5,175,739
DATED : December 29, 1992
INVENTOR(S) : Atsushi TAKEUCHI et al.

It is certified that error appears in the above-indentified patent and that said Letters Patent is hereby corrected as shown below:

Column 35, line 63, change "sire" to --wire--.

Signed and Sealed this

Fourteenth Day of December, 1993

Attest:

BRUCE LEHMAN

Attesting Officer

Commissioner of Patents and Trademarks